US012738267B1

(12) United States Patent
Harris et al.

(10) Patent No.: US 12,738,267 B1
(45) Date of Patent: Sep. 15, 2026

(54) BYSTANDER SPEECH COMMAND REJECTION FOR WEARABLE DEVICES

(71) Applicant: Snap Inc., Santa Monica, CA (US)

(72) Inventors: Daniel Harris, San Francisco, CA (US); Connor Cabrera, Weehawken, NJ (US); Hansel Guzman-Soto, Maple Valley, WA (US)

(73) Assignee: Snap Inc., Santa Monica, CA (US)

( * ) Notice: Subject to any disclaimer, the term of this patent is extended or adjusted under 35 U.S.C. 154(b) by 134 days.

(21) Appl. No.: 18/637,837

(22) Filed: Apr. 17, 2024

Related U.S. Application Data

(60) Provisional application No. 63/460,216, filed on Apr. 18, 2023.

(51) Int. Cl.
*G10L 15/16* (2006.01)
*G10L 15/22* (2006.01)

(52) U.S. Cl.
CPC .............. *G10L 15/16* (2013.01); *G10L 15/22* (2013.01)

(58) Field of Classification Search
USPC ...................................................... 704/1–504
See application file for complete search history.

(56) References Cited

U.S. PATENT DOCUMENTS 10,096,328 B1 10/2018 Markovich-Golan et al.
10,186,277 B2 1/2019 Salishev
10,567,898 B1 2/2020 Asfaw
10,959,027 B2 * 3/2021 Wexler .................... H04R 1/08
11,044,568 B2 6/2021 Asfaw et al.
11,128,636 B1 * 9/2021 Jorasch ............... A61B 5/6803
(Continued)

FOREIGN PATENT DOCUMENTS

CN 102077607 A 5/2011
CN 102708874 A 10/2012
(Continued)

OTHER PUBLICATIONS

"Korean Application Serial No. 10-2023-7023851, Notice of Preliminary Rejection mailed May 20, 2025", w/ English Translation, 17 pgs.

(Continued)

*Primary Examiner* — Marcus T Riley
(74) *Attorney, Agent, or Firm* — Schwegman Lundberg & Woessner, P.A.

(57) ABSTRACT

A system comprising a head-wearable apparatus, which includes a plurality of microphones, each microphone of the plurality of microphones being spatially separated from each other microphone of the plurality of microphones, thereby defining a set of spatial separations. The system also includes one or more processors. The system also includes a non-transitory computer readable storage medium including instructions that, when executed by the one or more processors, cause the one or more processors to perform operations including generating, by each microphone of the plurality of microphones, an audio signal corresponding to sound detected by the microphone, thereby generating a plurality of audio signals, and processing the plurality of audio signals, using a trained machine learning model, to generate wearer speech detection data representative of a likelihood that a wearer of the head-wearable apparatus is speaking.

20 Claims, 14 Drawing Sheets

(56) References Cited

U.S. PATENT DOCUMENTS

| | | | | |
|---|---|---|---|---|
| 11,342,051 | B1 | 5/2022 | Jain et al. | |
| 11,361,781 | B2 | 6/2022 | Asfaw et al. | |
| 11,632,640 | B2 | 4/2023 | Asfaw et al. | |
| 11,966,701 | B2 * | 4/2024 | Pu | G06T 19/006 |
| 12,010,505 | B2 * | 6/2024 | Arya | H04S 7/304 |
| 12,267,667 | B2 * | 4/2025 | Arya | G10L 19/008 |
| 12,475,170 | B2 * | 11/2025 | Botros | G02B 27/01 |
| 2004/0175008 | A1 | 9/2004 | Roeck et al. | |
| 2007/0030442 | A1 | 2/2007 | Howell et al. | |
| 2007/0098192 | A1 | 5/2007 | Sipkema | |
| 2009/0252360 | A1 | 10/2009 | Sipkema et al. | |
| 2011/0091057 | A1 | 4/2011 | Derkx | |
| 2012/0020485 | A1 | 1/2012 | Visser et al. | |
| 2014/0093091 | A1 | 4/2014 | Dusan et al. | |
| 2014/0185845 | A1 | 7/2014 | Udesen | |
| 2014/0270231 | A1 | 9/2014 | Dusan et al. | |
| 2014/0270244 | A1 | 9/2014 | Fan | |
| 2015/0170632 | A1 | 6/2015 | Olsson | |
| 2015/0341734 | A1 | 11/2015 | Sherman | |
| 2016/0100258 | A1 | 4/2016 | Bekri | |
| 2016/0192073 | A1 | 6/2016 | Poornachandran et al. | |
| 2016/0316304 | A1 | 10/2016 | Sprague et al. | |
| 2017/0303052 | A1 | 10/2017 | Kakareka et al. | |
| 2017/0358239 | A1 | 12/2017 | Arney et al. | |
| 2018/0078187 | A1 * | 3/2018 | Anwar | A61B 5/165 |
| 2019/0038216 | A1 | 2/2019 | Ser et al. | |
| 2019/0258315 | A1 | 8/2019 | Djokovic et al. | |
| 2020/0184043 | A1 | 6/2020 | Li et al. | |
| 2020/0296521 | A1 * | 9/2020 | Wexler | G06F 3/167 |
| 2020/0314577 | A1 | 10/2020 | Asfaw et al. | |
| 2020/0411026 | A1 | 12/2020 | Asfaw et al. | |
| 2021/0125609 | A1 | 4/2021 | Dusan et al. | |
| 2021/0290105 | A1 | 9/2021 | Lee | |
| 2021/0306751 | A1 | 9/2021 | Roach et al. | |
| 2021/0345055 | A1 | 11/2021 | Asfaw et al. | |
| 2021/0350821 | A1 | 11/2021 | Laberge et al. | |
| 2022/0006813 | A1 * | 1/2022 | Jorasch | A61B 5/6803 |
| 2022/0021988 | A1 * | 1/2022 | Wexler | G06V 40/16 |
| 2022/0165393 | A1 | 5/2022 | Inz et al. | |
| 2022/0175309 | A1 | 6/2022 | Vardas et al. | |
| 2022/0175313 | A1 | 6/2022 | Chaiwala | |
| 2022/0188361 | A1 * | 6/2022 | Botros | G06F 40/274 |
| 2022/0192622 | A1 * | 6/2022 | Arya | G16H 50/30 |
| 2022/0210111 | A1 * | 6/2022 | Greenberg | H04L 67/12 |
| 2022/0366926 | A1 | 11/2022 | Asfaw et al. | |
| 2022/0374130 | A1 * | 11/2022 | Pu | G06F 1/3209 |
| 2022/0377491 | A1 * | 11/2022 | Arya | H04S 3/008 |
| 2023/0042310 | A1 * | 2/2023 | Wexler | G06F 1/3278 |
| 2023/0128422 | A1 * | 4/2023 | Li | G06F 3/013<br>345/156 |
| 2023/0144825 | A1 * | 5/2023 | Hu | G10L 25/51<br>345/177 |
| 2023/0164106 | A1 * | 5/2023 | Greenberg | H04L 51/10<br>709/207 |
| 2023/0247378 | A1 | 8/2023 | Asfaw et al. | |
| 2023/0336694 | A1 * | 10/2023 | Wexler | G10L 25/63 |
| 2024/0054156 | A1 * | 2/2024 | Vincent | G10L 15/22 |
| 2024/0144949 | A1 * | 5/2024 | Yang | G10L 21/0216 |
| 2024/0296289 | A1 * | 9/2024 | Pu | G06N 3/098 |
| 2024/0298138 | A1 * | 9/2024 | Arya | G10L 19/008 |
| 2025/0178624 | A1 * | 6/2025 | Narayanan | G06N 3/044 |
| 2025/0203315 | A1 * | 6/2025 | Arya | H04S 7/00 |

FOREIGN PATENT DOCUMENTS

| | | | | |
|---|---|---|---|---|
| CN | 104717587 | A | 6/2015 | |
| CN | 105532017 | A | 4/2016 | |
| CN | 108464015 | A | 8/2018 | |
| CN | 109155884 | A | 1/2019 | |
| CN | 111696575 | A | 9/2020 | |
| CN | 111722184 | A * | 9/2020 | G01S 3/8083 |
| CN | 113647116 | A | 11/2021 | |
| CN | 114073101 | A | 2/2022 | |
| CN | 116685263 | A | 9/2023 | |
| CN | 116805998 | A | 9/2023 | |
| CN | 118235102 | A * | 6/2024 | G10L 25/51 |
| EP | 2884763 | A1 | 6/2015 | |
| EP | 4262562 | B1 | 2/2026 | |
| JP | 2018186494 | A | 11/2018 | |
| KR | 20170129697 | A | 11/2017 | |
| KR | 102506593 | B1 | 3/2023 | |
| KR | 102586866 | B1 | 10/2023 | |
| KR | 102608630 | B1 | 11/2023 | |
| KR | 102672618 | B1 | 5/2024 | |
| KR | 102864505 | B1 | 9/2025 | |
| WO | WO-9326085 | A1 | 12/1993 | |
| WO | WO-0191513 | A2 | 11/2001 | |
| WO | WO-2009132646 | A1 | 11/2009 | |
| WO | WO-2020205194 | A1 | 10/2020 | |
| WO | WO-2020264299 | A1 | 12/2020 | |
| WO | WO-2021026881 | A1 | 2/2021 | |
| WO | WO-2021084488 | A1 | 5/2021 | |
| WO | WO-2021198941 | A1 | 10/2021 | |
| WO | WO-2022125938 | A1 * | 6/2022 | G02B 27/01 |
| WO | WO-2022133410 | A1 | 6/2022 | |
| WO | WO-2022146898 | A1 * | 7/2022 | H04L 67/535 |

OTHER PUBLICATIONS

"Korean Application Serial No. 10-2023-7023851, Response Filed Jul. 18, 2025 to Notice of Preliminary Rejection mailed May 20, 2025", w/ English Claims, 21 pgs.
"U.S. Appl. No. 16/370,190, Amendment under 37 C.F.R. 1.312 filed Dec. 27, 2019", 8 pgs.
"U.S. Appl. No. 16/370,190, Notice of Allowance mailed Sep. 27, 2019", 10 pgs.
"U.S. Appl. No. 16/370,190, PTO Response to Rule 312 Communication mailed Jan. 21, 2020", 2 pgs.
"U.S. Appl. No. 16/732,899, Examiner Interview Summary mailed Sep. 27, 2019", 1 pg.
"U.S. Appl. No. 16/732,899, Non Final Office Action mailed Jul. 28, 2020", 8 pgs.
"U.S. Appl. No. 16/732,899, Notice of Allowability mailed Apr. 15, 2021", 5 pgs.
"U.S. Appl. No. 16/732,899, Notice of Allowance mailed Feb. 23, 2021", 8 pgs.
"U.S. Appl. No. 16/732,899, Response filed Oct. 28, 2020 to Non Final Office Action mailed Jul. 28, 2020", 9 pgs.
"U.S. Appl. No. 16/913,289, Non Final Office Action mailed Sep. 2, 2021", 14 pgs.
"U.S. Appl. No. 16/913,289, Notice of Allowability mailed May 5, 2022", 2 pgs.
'U.S. Appl. No. 16/913,289, Notice of Allowance mailed Feb. 16, 2022, 10 pgs.
"U.S. Appl. No. 16/913,289, Response filed Dec. 2, 2021 to Non Final Office Action mailed Sep. 2, 2021", 11 pgs.
"U.S. Appl. No. 17/303,534, Non Final Office Action mailed Jul. 5, 2022", 12 pgs.
"U.S. Appl. No. 17/303,534, Notice of Allowance mailed Dec. 2, 2022", 7 pgs.
"U.S. Appl. No. 17/303,534, Preliminary Amendment filed Jul. 27, 2021", 8 pgs.
"U.S. Appl. No. 17/303,534, Response filed Oct. 5, 2022 to Non Final Office Action mailed Jul. 5, 2022", 11 pgs.
"U.S. Appl. No. 17/303,534, Supplemental Notice of Allowability mailed Jan. 9, 2023", 2 pgs.
"U.S. Appl. No. 17/456,096, Advisory Action mailed Jun. 11, 2024", 4 pgs.
"U.S. Appl. No. 17/456,096, Final Office Action mailed Jan. 13, 2025", 26 pgs.
"U.S. Appl. No. 17/456,096, Final Office Action mailed Apr. 1, 2024", 21 pgs.
"U.S. Appl. No. 17/456,096, Non Final Office Action mailed Jul. 12, 2024", 23 pgs.
"U.S. Appl. No. 17/456,096, Non Final Office Action mailed Oct. 12, 2023", 21 pgs.
"U.S. Appl. No. 17/456,096, Response filed Jan. 10, 2024 to Non Final Office Action mailed Oct. 12, 2023", 12 pgs.

(56) References Cited

OTHER PUBLICATIONS

"U.S. Appl. No. 17/456,096, Response filed May 31, 2024 to Final Office Action mailed Apr. 1, 2024", 10 pgs.
"U.S. Appl. No. 17/456,096, Response filed Oct. 15, 2024 to Non Final Office Action mailed Jul. 12, 2024", 9 pgs.
"U.S. Appl. No. 17/839,236, Final Office Action mailed Apr. 10, 2024", 20 pgs.
"U.S. Appl. No. 17/839,236, Final Office Action mailed Sep. 1, 2023", 23 pgs.
"U.S. Appl. No. 17/839,236, Non Final Office Action mailed Mar. 16, 2023", 21 pgs.
"U.S. Appl. No. 17/839,236, Non Final Office Action mailed Mar. 21, 2023", 22 pgs.
"U.S. Appl. No. 17/839,236, Non Final Office Action mailed Dec. 21, 2023", 15 pgs.
"U.S. Appl. No. 17/839,236, Preliminary Amendment filed Aug. 3, 2022", 8 pgs.
"U.S. Appl. No. 17/839,236, Response filed Mar. 21, 2024 to Non Final Office Action mailed Dec. 21, 2023". 13 pgs.
"U.S. Appl. No. 17/839,236, Response filed Jun. 21, 2023 to Non Final Office Action mailed Mar. 21, 2023", 12 pgs.
"U.S. Appl. No. 17/839,236, Response filed Nov. 28, 2023 to Final Office Action mailed Sep. 1, 2023", 12 pgs.
"Chinese Application Serial No. 202080047279.2, Office Action mailed Feb. 16, 2023", w/ English Translation, 4 pgs.
"Chinese Application Serial No. 202080047279.2, Office Action mailed Sep. 2, 2022", w/ English translation, 7 pgs.
"Chinese Application Serial No. 202080047279.2, Response filed Jan. 5, 2023 to Office Action mailed Sep. 2, 2022", w/ English Claims, 10 pgs.
"Chinese Application Serial No. 202180084819.9, Voluntary Amendment filed Dec. 15, 2023", w/ English claims, 9 pgs.
"European Application Serial No. 20717461.6, Communication Pursuant to Article 94(3) EPC mailed Nov. 16, 2022", 7 pgs.
"European Application Serial No. 20743430.9, Communication Pursuant to Article 94(3) EPC mailed Jan. 2, 2023", 8 pgs.
"European Application Serial No. 20743430.9, Communication Pursuant to Article 94(3) EPC mailed Dec. 20, 2024", 7 pgs.
"European Application Serial No. 20743430.9, Response filed Apr. 3, 2025 to Communication Pursuant to Article 94(3) EPC mailed Dec. 20, 2024", 17 pgs.
"European Application Serial No. 20743430.9, Response Filed Jun. 19, 2023 to Communication Pursuant to Article 94(3) EPC mailed Jan. 2, 2023", 16 pgs.
"European Application Serial No. 20743430.9, Response to Communication Pursuant to Rules 161 and 162 EPC filed Aug. 15, 2022", 16 pgs.
"International Application Serial No. PCT/US2020/022311, International Preliminary Report on Patentability mailed Oct. 14, 2021", 7 pgs.
"International Application Serial No. PCT/US2020/022311, International Search Report mailed Jun. 24, 2020", 5 pgs.
"International Application Serial No. PCT/US2020/022311, Written Opinion mailed Jun. 24, 2020", 5 pgs.
"International Application Serial No. PCT/US2020/039826, International Preliminary Report on Patentability mailed Jan. 6, 2022", 10 pgs.
"International Application Serial No. PCT/US2020/039826, International Search Report mailed Oct. 15, 2020", 4 pgs
"International Application Serial No. PCT/US2020/039826, Written Opinion mailed Oct. 15, 2020", 8 pgs.
"International Application Serial No. PCT/US2021/072861, International Preliminary Report on Patentability mailed Jun. 29, 2023", 8 pgs.
"International Application Serial No. PCT/US2021/072861, International Search Report mailed Apr. 4, 2022", 5 pgs.
"International Application Serial No. PCT/US2021/072861, Written Opinion mailed Apr. 4, 2022", 6 pgs.
"Korean Application Serial No. 10-2021-7034744, Notice of Preliminary Rejection mailed Sep. 5, 2022", w/ English Translation, 4 pgs.
"Korean Application Serial No. 10-2021-7034744, Response filed Nov. 7, 2022 to Notice of Preliminary Rejection mailed Sep. 5, 2022", w/ English Claims, 15 pgs.
"Korean Application Serial No. 10-2022-7002742, Notice of Preliminary Rejection mailed Mar. 30, 2023", w/ English Translation, 9 pgs.
"Korean Application Serial No. 10-2023-7007297, Notice of Preliminary Rejection mailed May 10, 2023", w/ English Translation, 11 pgs.
Jerath, Ravinder, et al., "Respiratory Rhythm, Autonomic Modulation, and the Spectrum of Emotions: The Future of Emotion Recognition and Modulation", Frontiers in Psychology, vol. 11, Article 1980, (Aug. 2020), 7 pgs.
Reichert, Sandra, et al., "Analysis of Respiratory Sounds: State of the Art", Clinical Medicine: Circulatory, Respiratory and Pulmonary Medicine:2, (2008), 45-58.
Tan, "WIPO Publication 2021/026881", translation from Clarivate Analytics, (2021).
Wang, Anran, et al., "Contactless Infant Monitoring using White Noise", Mobile Computing and Networking, ACM, 2 Penn Plaza, Suite 701, New York, NY 10121-0701USA, (Oct. 11, 2019), 1-16.
"Chinese Application Serial No. 202180084819.9, Office Action mailed Jan. 10, 2026", w/ English translation, 12 pgs.
"Korean Application Serial No. 10-2023-7023851, Notice of Preliminary Rejection mailed Feb. 24, 2026", w/ English Translation, 14 pgs.

* cited by examiner

FIG. 2

BYSTANDER SPEECH COMMAND REJECTION FOR WEARABLE DEVICES

CLAIM OF PRIORITY

This application claims the benefit of priority to U.S. Provisional Application Ser. No. 63/460,216, filed Apr. 18, 2023, which is incorporated herein by reference in its entirety.

TECHNICAL FIELD

The present disclosure relates generally to voice commands and more particularly to voice control of wearable devices.

BACKGROUND

Voice commands provide a promising modality for user input to mobile devices, including wearable devices such as augmented reality glasses. However, a device equipped with microphones for detecting and recognizing voice commands is at risk of having its voice command functionality triggered by speech that does not originate from the wearer or user of the device, but is instead spoken by others in the user's environment or, more generally, voices originating from sources other than the user such as electronic speakers (such non-user speech sources being referred to herein as "bystanders"). A device that permits non-users to trigger voice commands presents a security and privacy risk, potentially allowing unauthorized entities to access information and control functions of the device even when it is in the physical control of its user.

These security and privacy risks can be mitigated by providing a further layer of authentication to the voice command interface, but these further layers of authentication can present usability issues (e.g., requiring a user to provide a password after every voice command), further security and privacy challenges (e.g., passwords spoken aloud in public cannot be maintained as secrets), and/or technical challenges (e.g., use of a voiceprint for user authentication requires calibration to a specific user and may not be robust or reliable). Furthermore, even if an extra layer of authentication is used, computing resources may be consumed every time bystander speech is detected by the device, when the device records the bystander speech and forwards it for further processing and authentication. This can reduce the battery life of the device and increase the computing load on the device and any associated processing systems, especially in noisy environments.

Accordingly, bystander speech presents a number of technical problems for devices operated using voice commands.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 2 is a diagrammatic representation of a messaging system, according to some examples, that has both client-side and server-side functionality.

DETAILED DESCRIPTION

Figure 1:
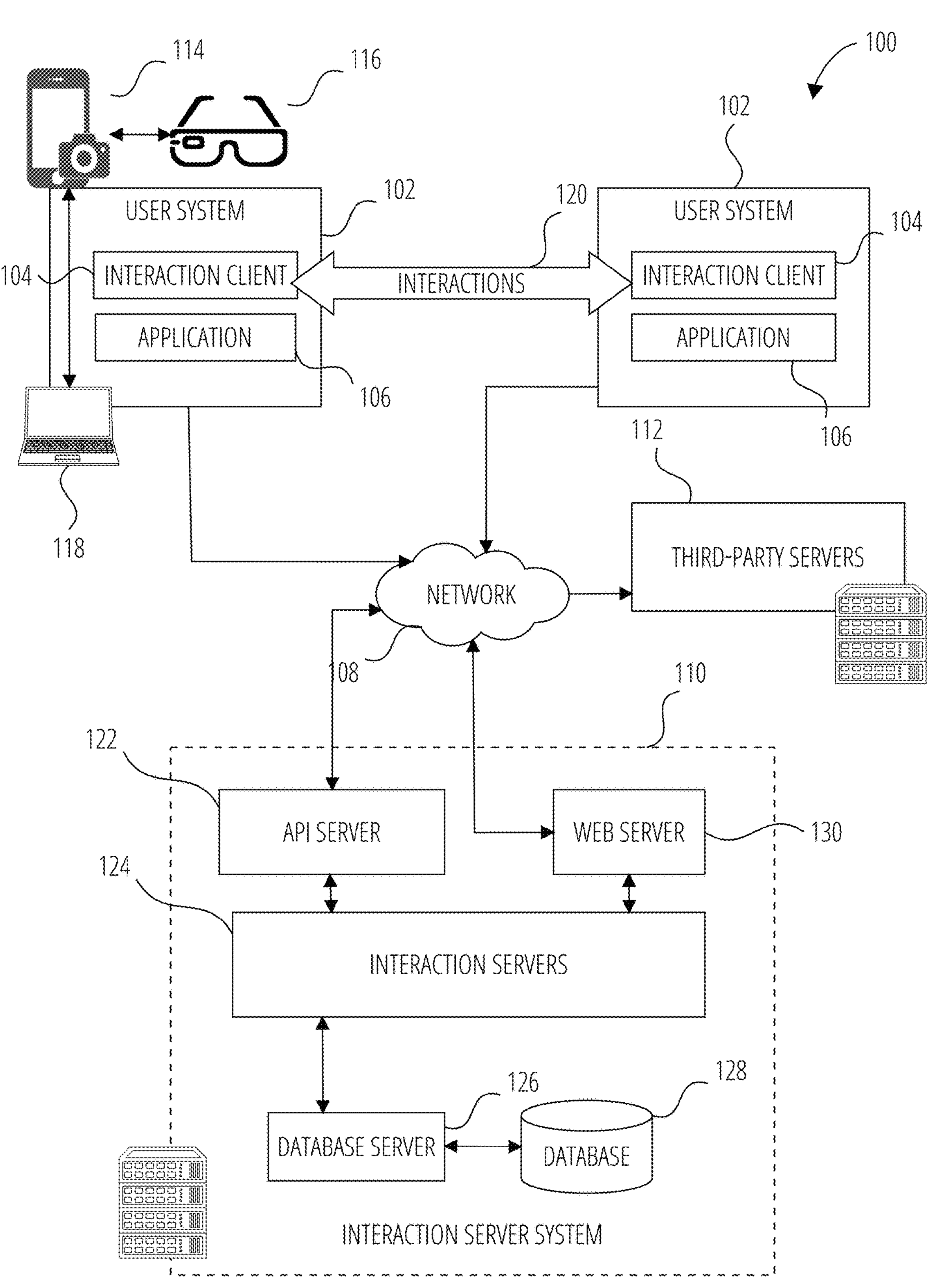
FIG. 1 is a diagrammatic representation of a networked environment in which the present disclosure may be deployed, according to some examples.

Systems and methods are disclosed herein that provide bystander speech rejection for a wearable device, in particular a head-wearable apparatus such as a pair of augmented reality glasses. The device is equipped with an array of spatially separated microphones having a known set of spatial relationships with each other and with the speaker's mouth. This set of known spatial relations between the microphones and the speaker's mouth, and the known operating parameters of the microphones of the device, can be leveraged to train a machine learning model to distinguish between speech by the wearer of the device ("wearer speech") and speech from other sound sources ("bystander speech") with a high degree of accuracy. The trained machine learning model can then be deployed to perform this classification task as part of a system providing the voice command functionality of the wearable device.

In examples disclosed herein, a data pipeline procedure is disclosed for generating a training dataset for training the machine learning model by generating a set of recordings of sounds from various directions using an array of spatially separated microphones that simulates the spatial and acoustic configuration of the wearable device and its microphones. One of the directions is a direction corresponding to a wearer speech location, e.g., the user's mouth region. The recordings of the directional sounds are converted to directional impulse response (DIR) profiles, each of which is used as a filter that can be applied to a library of source audio recordings to generate multi-channel audio recordings that simulate the effect of the wearable's microphones registering the source audio recording issuing from a given direction. Additional pre-processing and/or data augmentation steps can be performed on the multi-channel audio recordings in some embodiments, such as mixing each multi-channel audio recording with various noise profiles at various signal to noise ratios, thereby generating multiple noisy versions of each multi-channel audio recording.

In some examples, the multi-channel audio recordings and/or noisy multi-channel audio recordings are converted into spectrogram prior to being provided as input to the machine learning model. This enables the use of a machine learning model architecture and training techniques optimized for computer vision, as the spectrogram of each channel of each audio recording can be processed as a two-dimensional image by the machine learning model. The machine learning model can be structured as a classifier having a convolutional neural network (CNN) portion to extract features from the spectrogram inputs, followed by a classifier head having one or more fully connected layers to output classification information that can be used as wearer speech detection data. The labels of the input samples, corresponding to the directions of the directional sounds serving as the source for the samples, are used as ground truth data for training the machine learning model using supervised learning.

Further examples disclosed herein provide systems that conserve power and computational resources by preventing the further processing of bystander speech by a voice command system based on the predictions of the trained machine learning model.

Thus, examples disclosed herein attempt to address several of the technical problems presented by bystander speech. Security and privacy can be maintained without loss of usability for a wearable device using a voice command interface, because the wearer of the device can issue voice commands without relying on further authentication such as a password, without the risk of bystanders being able to control or access the device using their own speech. Furthermore, power and computational resources can be conserved by limiting the processing of speech data by a voice command system to those sounds in the environment that correspond to wearer speech. The detection of wearer speech is robust and accurate enough, based on experimental testing of example implementations, that further safeguards or filters such as voiceprint identification or voice activity detection (VAD) are unnecessary for the purpose of limiting voice command functionality to the wearer of the device; thus, examples disclosed herein may also reduce the need for user-specific calibration or other cumbersome or technically complex techniques.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

System Architecture

Figure 2:
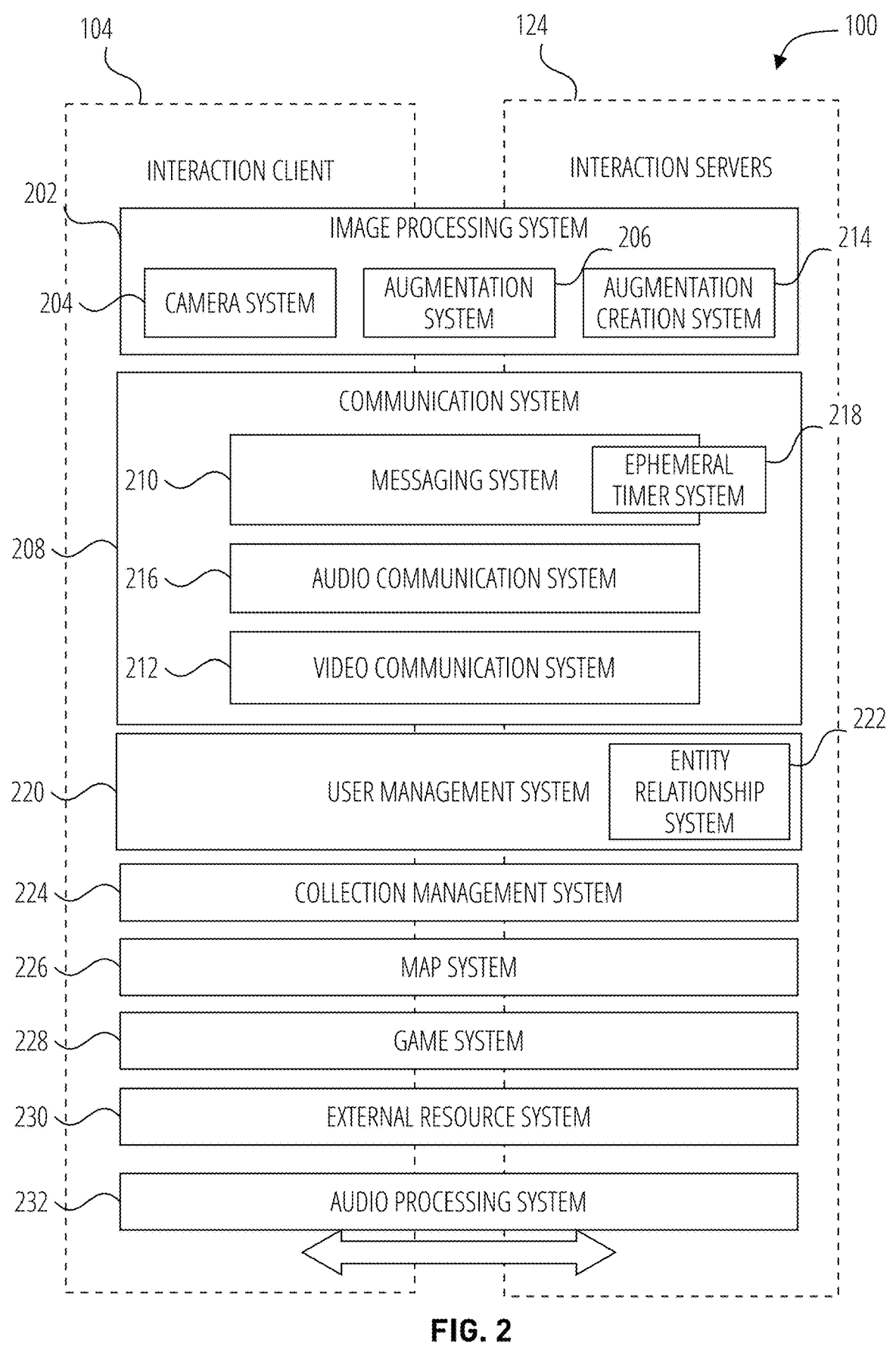

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 302 of a user system 102. These augmentations are selected by the augmentation system 206 and presented to a user of an interaction client 104, based on a number of inputs and data, such as for example:

- Geolocation of the user system 102; and
- Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes an entity relationship system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An audio processing system 232 includes control software (e.g., in an audio recording, audio playback, or voice command application) that interacts with and controls microphone and/or speaker hardware (e.g., directly or via operating system controls) of the user system 102 to record or play back audio data and/or to enable voice commands, and includes capacity for processing audio signals by performing mathematical operations on said signals. In some examples, the bystander speech command rejection methods described herein may be implemented by the audio processing system 232. Accordingly, in some examples the audio processing system 232 includes a trained machine learning model as further described below with reference to FIG. 9 to FIG. 14.

System with Head-Wearable Apparatus

Figure 3:
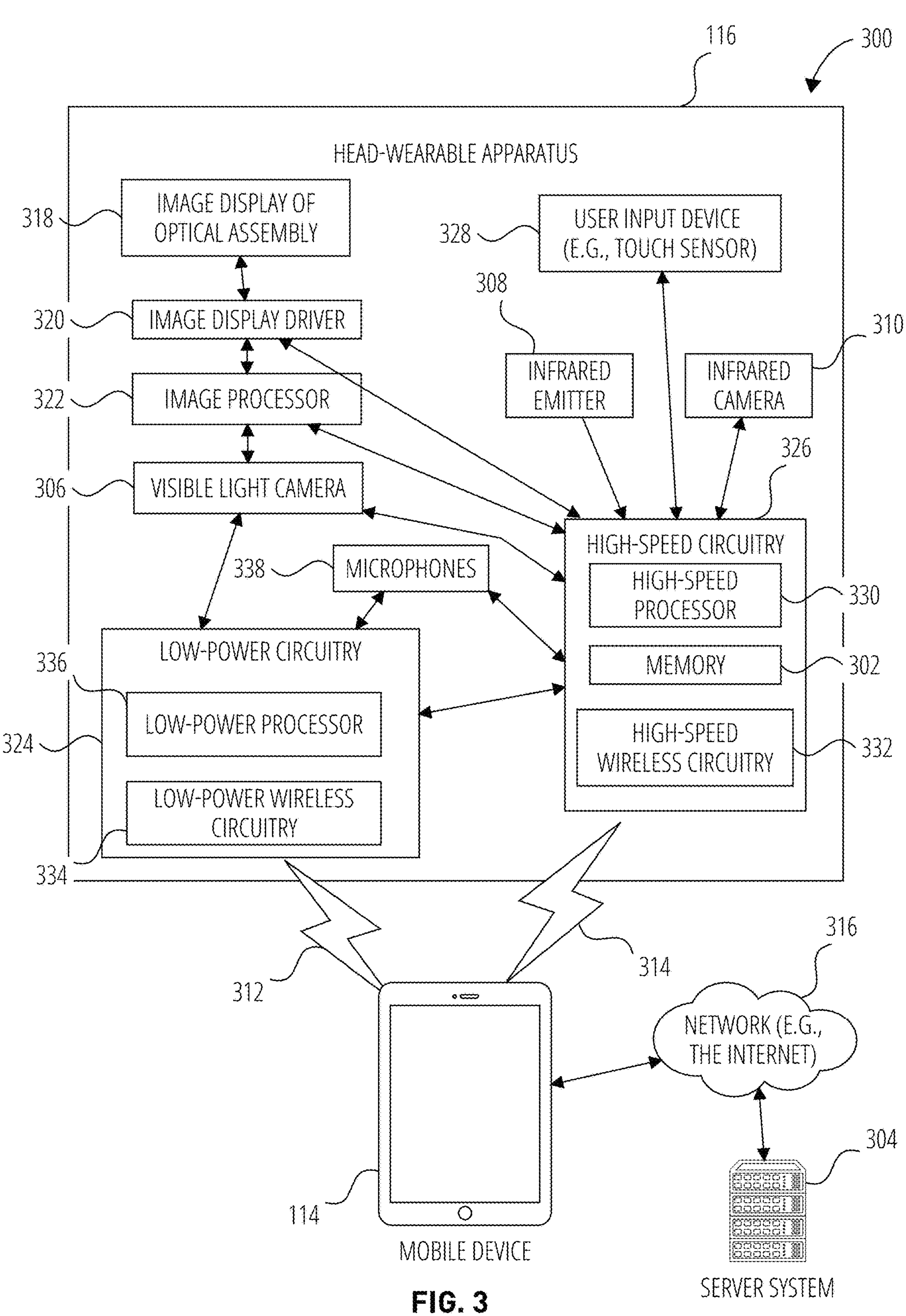
FIG. 3 illustrates a system including the head-wearable apparatus of FIG. 1, according to some examples.

FIG. 3 illustrates a system 300 including a head-wearable apparatus 116 with a selector input device, according to some examples. FIG. 3 is a high-level functional block diagram of an example head-wearable apparatus 116 communicatively coupled to a mobile device 114 and various server systems 304 (e.g., the interaction server system 110) via various networks 108.

The head-wearable apparatus 116 includes multiple microphones 338, which are described in greater detail below with reference to FIG. 6 to FIG. 8.

The head-wearable apparatus 116 includes one or more cameras, each of which may be, for example, a visible light camera 306, an infrared emitter 308, and an infrared camera 310.

The mobile device 114 connects with head-wearable apparatus 116 using both a low-power wireless connection 312 and a high-speed wireless connection 314. The mobile device 114 is also connected to the server system 304 and the network 316.

The head-wearable apparatus 116 further includes two image displays of the image display of optical assembly 318. The two image displays of optical assembly 318 include one associated with the left lateral side and one associated with the right lateral side of the head-wearable apparatus 116. The head-wearable apparatus 116 also includes an image display driver 320, an image processor 322, low-power circuitry 324, and high-speed circuitry 326. The image display of optical assembly 318 is for presenting images and videos, including an image that can include a graphical user interface to a user of the head-wearable apparatus 116.

The image display driver 320 commands and controls the image display of optical assembly 318. The image display driver 320 may deliver image data directly to the image display of optical assembly 318 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a pair of frames and a stem (or temple) extending backward from a lateral side of each frame, as described in greater detail below with reference to FIG. 6 to FIG. 8. The head-wearable apparatus 116 further includes a user input device 328 (e.g., touch sensor or push button), including an input surface on the head-wearable apparatus 116. The user input device 328 (e.g., touch sensor or push button) is to receive from the user an input selection to manipulate the graphical user interface of the presented image.

The components shown in FIG. 3 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 306 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 302, which stores instructions to perform a subset or all of the functions described herein. The memory 302 can also include one or more storage devices.

As shown in FIG. 3, the high-speed circuitry 326 includes a high-speed processor 330, a memory 302, and high-speed wireless circuitry 332. In some examples, the image display driver 320 is coupled to the high-speed circuitry 326 and operated by the high-speed processor 330 in order to drive the left and right image displays of the image display of optical assembly 318. The high-speed processor 330 may be any processor capable of managing high-speed communications and operation of any general computing system needed for the head-wearable apparatus 116. The high-speed processor 330 includes processing resources needed for managing high-speed data transfers on a high-speed wireless connection 314 to a wireless local area network (WLAN) using the high-speed wireless circuitry 332. In certain examples, the high-speed processor 330 executes an operating system such as a LINUX operating system or other such operating system of the head-wearable apparatus 116, and the operating system is stored in the memory 302 for execution. In addition to any other responsibilities, the high-speed processor 330 executing a software architecture for the head-wearable apparatus 116 is used to manage data transfers with high-speed wireless circuitry 332. In certain examples, the high-speed wireless circuitry 332 is configured to implement Institute of Electrical and Electronic Engineers (IEEE) 802.11 communication standards, also referred to herein as WiFi. In some examples, other high-speed communications standards may be implemented by the high-speed wireless circuitry 332.

The low-power wireless circuitry 334 and the high-speed wireless circuitry 332 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 312 and the high-speed wireless connection 314, may be implemented using details of the architecture of the head-wearable apparatus 116, as can other elements of the network 316.

In some examples, the low-power wireless circuitry 334 and the high-speed wireless circuitry 332 of the head-wearable apparatus 116 are used to control and communicate with the microphones 338 to generate and/or process audio data captured by the microphones 338, as described in greater detail below with reference to FIG. 6 to FIG. 9.

The memory 302 includes any storage device capable of storing various data and applications, including, among other things, camera data generated by the left and right visible light cameras 306, the infrared camera 310, and the image processor 322, as well as images generated for display by the image display driver 320 on the image displays of the image display of optical assembly 318. While the memory 302 is shown as integrated with high-speed circuitry 326, in some examples, the memory 302 may be an independent standalone element of the head-wearable apparatus 116. In certain such examples, electrical routing lines may provide a connection through a chip that includes the high-speed processor 330 from the image processor 322 or the low-power processor 336 to the memory 302. In some examples, the high-speed processor 330 may manage addressing of the memory 302 such that the low-power processor 336 will boot the high-speed processor 330 any time that a read or write operation involving memory 302 is needed.

As shown in FIG. 3, the low-power processor 336 or high-speed processor 330 of the head-wearable apparatus 116 can be coupled to the microphones 338, the camera (visible light camera 306, infrared emitter 308, or infrared camera 310), the image display driver 320, the user input device 328 (e.g., touch sensor or push button), and the memory 302.

The head-wearable apparatus 116 is connected to a host computer. For example, the head-wearable apparatus 116 is paired with the mobile device 114 via the high-speed wireless connection 314 or connected to the server system 304 via the network 316. The server system 304 may be one or more computing devices as part of a service or network computing system, for example, that includes a processor, a memory, and network communication interface to communicate over the network 316 with the mobile device 114 and the head-wearable apparatus 116.

The mobile device 114 includes a processor and a network communication interface coupled to the processor. The network communication interface allows for communication over the network 316, low-power wireless connection 312, or high-speed wireless connection 314. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 320. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 304, such as the user input device 328, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 312 and high-speed wireless connection 314 from the mobile device 114 via the low-power wireless circuitry 334 or high-speed wireless circuitry 332.

Machine Architecture

Figure 4:
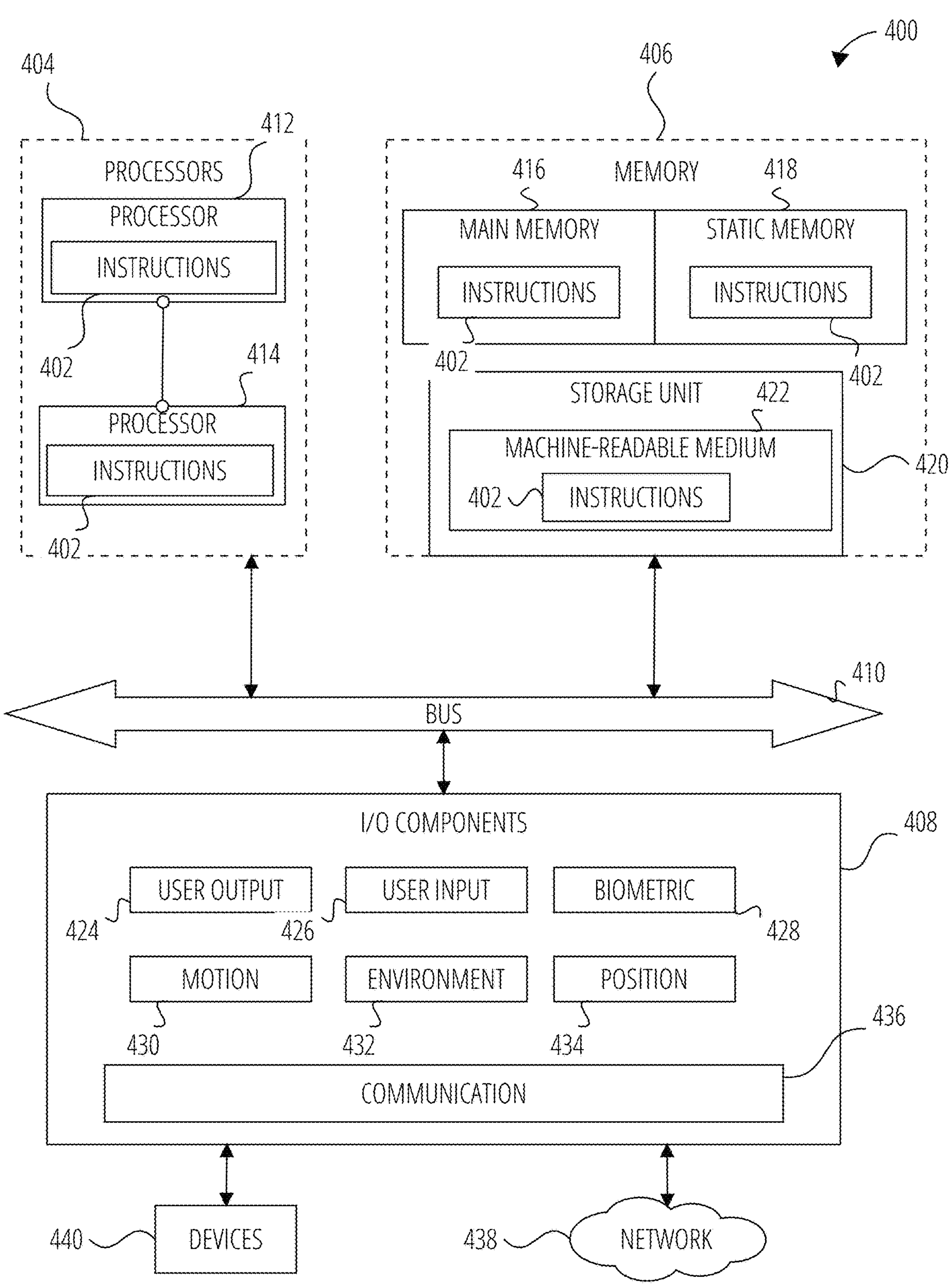
FIG. 4 is a diagrammatic representation of a machine in the form of a computer system within which a set of instructions may be executed to cause the machine to perform any one or more of the methodologies discussed herein, according to some examples.

FIG. 4 is a diagrammatic representation of the machine 400 within which instructions 402 (e.g., software, a program, an application, an applet, an app, or other executable code) for causing the machine 400 to perform any one or more of the methodologies discussed herein may be executed. For example, the instructions 402 may cause the machine 400 to execute any one or more of the methods described herein. The instructions 402 transform the general, non-programmed machine 400 into a particular machine 400 programmed to carry out the described and illustrated functions in the manner described. The machine 400 may operate as a standalone device or may be coupled (e.g., networked)

to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 402, sequentially or otherwise, that specify actions to be taken by the machine 400. Further, while a single machine 400 is illustrated, the term "machine" shall also be taken to include a collection of machines that individually or jointly execute the instructions 402 to perform any one or more of the methodologies discussed herein. The machine 400, for example, may comprise the user system 102 or any one of multiple server devices forming part of the interaction server system 110. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 408, which may be configured to communicate with each other via a bus 410. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 412 and a processor 414 that execute the instructions 402. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 416, a static memory 418, and a storage unit 420, both accessible to the processors 404 via the bus 410. The main memory 406, the static memory 418, and storage unit 420 store the instructions 402 embodying any one or more of the methodologies or functions described herein. The instructions 402 may also reside, completely or partially, within the main memory 416, within the static memory 418, within machine-readable medium 422 within the storage unit 420, within at least one of the processors 404 (e.g., within the processor's cache memory), or any suitable combination thereof, during execution thereof by the machine 400.

The I/O components 408 may include a wide variety of components to receive input, provide output, produce output, transmit information, exchange information, capture measurements, and so on. The specific I/O components 408 that are included in a particular machine will depend on the type of machine. For example, portable machines such as mobile phones may include a touch input device or other such input mechanisms, while a headless server machine will likely not include such a touch input device. It will be appreciated that the I/O components 408 may include many other components that are not shown in FIG. 4. In various examples, the I/O components 408 may include user output components 424 and user input components 426. The user output components 424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., one or more microphones), and the like.

In further examples, the I/O components 408 may include biometric components 428, motion components 430, environmental components 432, or position components 434, among a wide array of other components. For example, the biometric components 428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 430 include acceleration sensor components (e.g., accelerometer), gravitation sensor components, rotation sensor components (e.g., gyroscope).

The environmental components 432 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise and/or other sounds), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 408 further include communication components 436 operable to couple the machine 400 to a network 438 or devices 440 via respective coupling or connections. For example, the communication components 436 may include a network interface component or another suitable device to interface with the network 438. In further examples, the communication components 436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 440 may be another machine or any of a wide variety of peripheral devices (e.g., a peripheral device coupled via a USB).

Moreover, the communication components 436 may detect identifiers or include components operable to detect identifiers. For example, the communication components 436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 436, such as location via Internet Protocol (IP) geolocation, location via Wi-Fi® signal triangulation, location via detecting an NFC beacon signal that may indicate a particular location, and so forth.

The various memories (e.g., main memory 416, static memory 418, and memory of the processors 404) and storage unit 420 may store one or more sets of instructions and data structures (e.g., software) embodying or used by any one or more of the methodologies or functions described herein. These instructions (e.g., the instructions 402), when executed by processors 404, cause various operations to implement the disclosed examples.

The instructions 402 may be transmitted or received over the network 438, using a transmission medium, via a network interface device (e.g., a network interface component included in the communication components 436) and using any one of several well-known transfer protocols (e.g., hypertext transfer protocol (HTTP)). Similarly, the instructions 402 may be transmitted or received using a transmission medium via a coupling (e.g., a peer-to-peer coupling) to the devices 440.

Software Architecture

Figure 5:
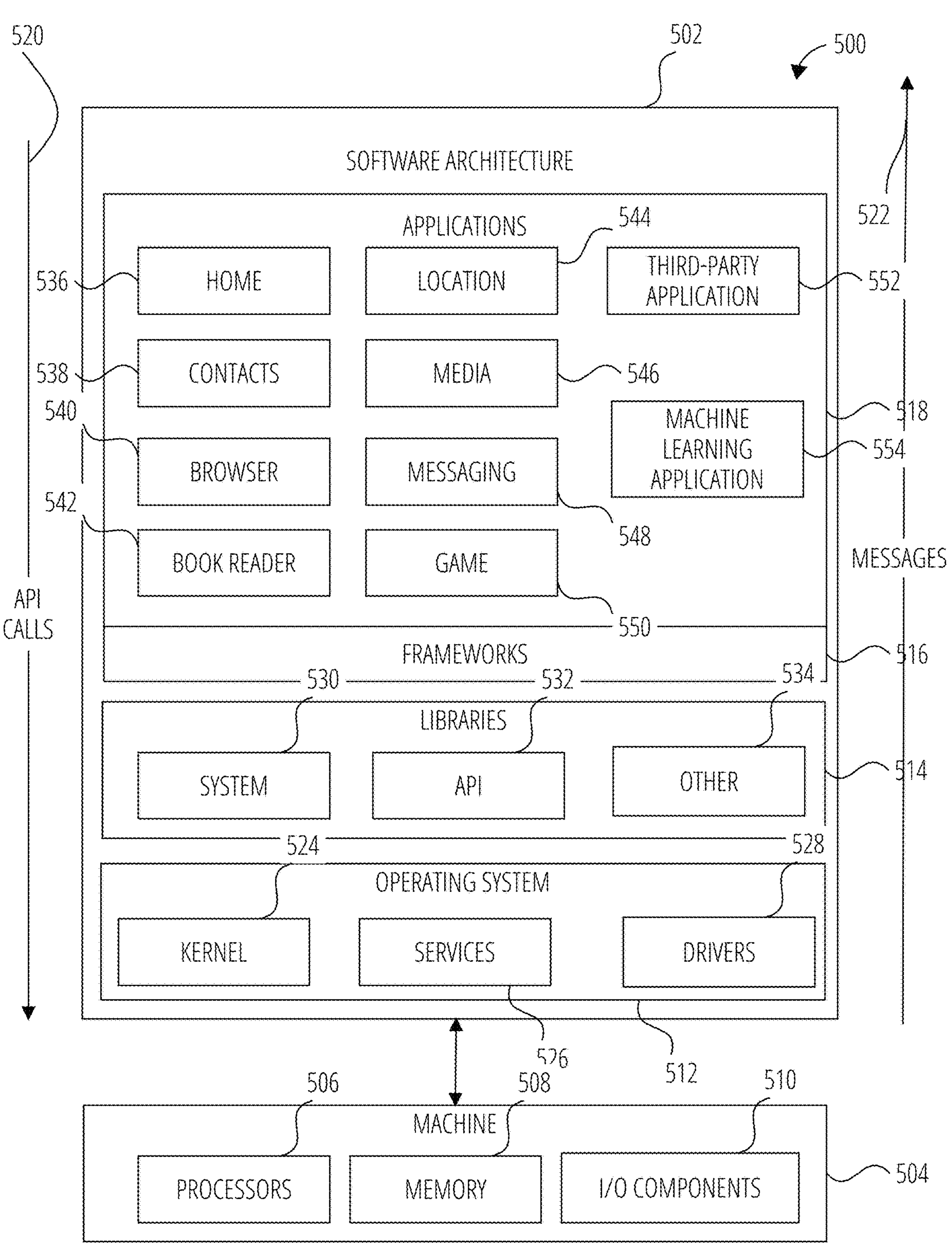
FIG. 5 is a block diagram showing a software architecture within which examples may be implemented.

FIG. 5 is a block diagram 500 illustrating a software architecture 502, which can be installed on any one or more of the devices described herein. The software architecture 502 is supported by hardware such as a machine 504 that includes processors 506, memory 508, and I/O components 510. In this example, the software architecture 502 can be conceptualized as a stack of layers, where each layer provides a particular functionality. The software architecture 502 includes layers such as an operating system 512, libraries 514, frameworks 516, and applications 518. Operationally, the applications 518 invoke API calls 520 through the software stack and receive messages 522 in response to the API calls 520.

The operating system 512 manages hardware resources and provides common services. The operating system 512 includes, for example, a kernel 524, services 526, and drivers 528. The kernel 524 acts as an abstraction layer between the hardware and the other software layers. For example, the kernel 524 provides memory management, processor management (e.g., scheduling), component management, networking, and security settings, among other functionalities. The services 526 can provide other common services for the other software layers. The drivers 528 are responsible for controlling or interfacing with the underlying hardware. For instance, the drivers 528 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 514 provide a common low-level infrastructure used by the applications 518. The libraries 514 can include system libraries 530 (e.g., C standard library) that provide functions such as memory allocation functions, string manipulation functions, mathematic functions, and the like. In addition, the libraries 514 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), machine learning libraries (e.g., to provide supervised learning and/or other training functionality for training machine learning models), and the like. The libraries 514 can also include a wide variety of other libraries 534 to provide many other APIs to the applications 518.

The frameworks 516 provide a common high-level infrastructure that is used by the applications 518. For example, the frameworks 516 provide various graphical user interface (GUI) functions, high-level resource management, and high-level location services. The frameworks 516 can provide a broad spectrum of other APIs that can be used by the applications 518, some of which may be specific to a particular operating system or platform.

In an example, the applications 518 may include a home application 536, a contacts application 538, a browser application 540, a book reader application 542, a location application 544, a media application 546, a messaging application 548, a game application 550, a machine learning application 554, and a broad assortment of other applications such as a third-party application 552. The applications 518 are programs that execute functions defined in the programs. Various programming languages can be employed to create one or more of the applications 518, structured in a variety of manners, such as object-oriented programming languages (e.g., Objective-C, Java, or C++) or procedural programming languages (e.g., C or assembly language). In a specific example, the third-party application 552 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 552 can invoke the API calls 520 provided by the operating system 512 to facilitate functionalities described herein.

In an example, the machine learning application 554 includes a machine learning model that can be trained (e.g., using example methods described herein) to generate a trained machine learning model as described in greater detail below with reference to FIG. 13 to FIG. 14.

Figure 6:
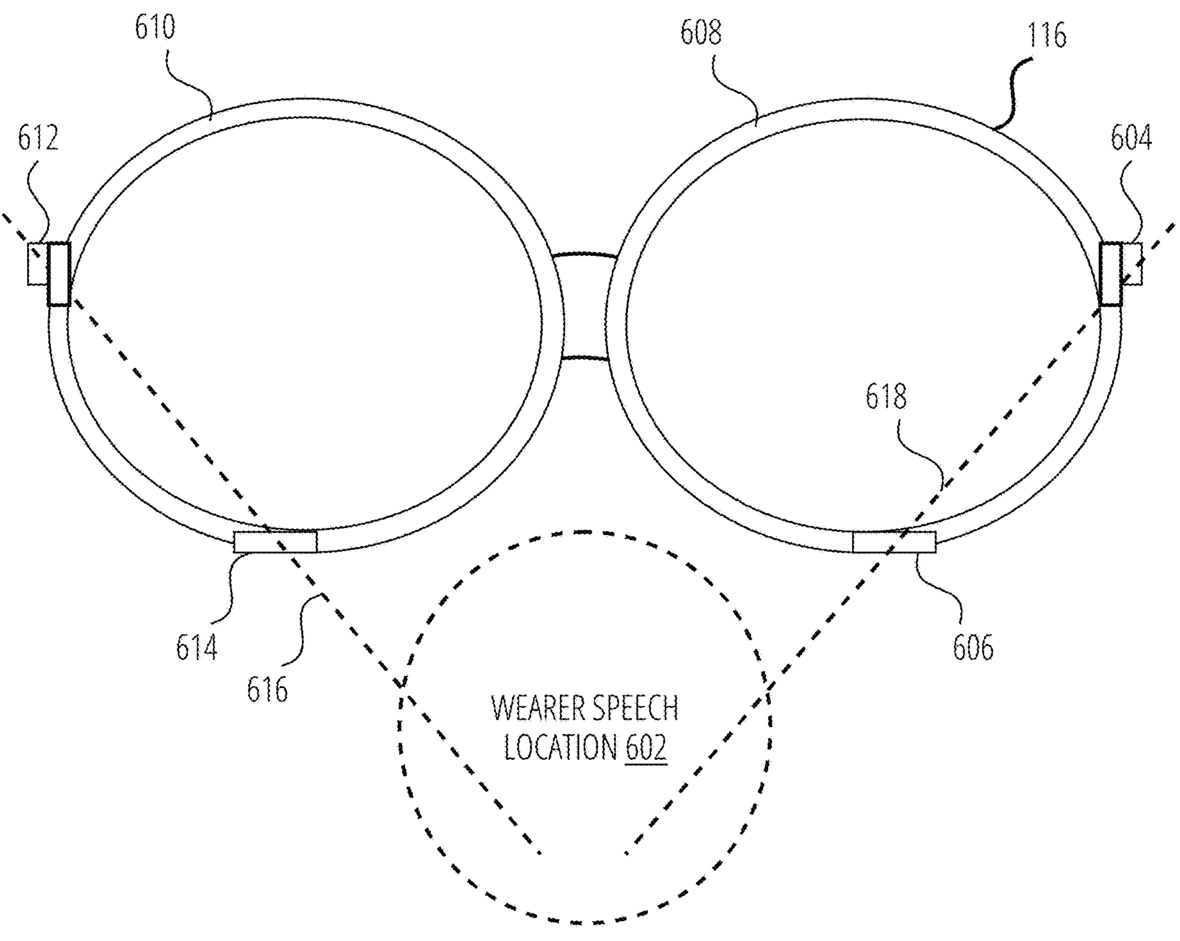
FIG. 6 is a front view of the head-wearable apparatus embodied as a pair of augmented reality glasses illustrating a wearer speech location, according to some examples.

FIG. 6 shows a front view of an example head-wearable apparatus 116 shown as a pair of augmented reality glasses having a pair of frames (left frame 608 a right frame 610) and a stem extending backward from a lateral side of each frame (not shown). The head-wearable apparatus 116 includes two or more microphones 338 used to perform techniques and methodologies described herein. In the example of FIG. 6, the head-wearable apparatus 116 includes six microphones 338, for of which are visible in FIG. 6: a first microphone 604 in a first location on the left stem, a third microphone 606 in a third location on a lower portion of the left frame 608, a fourth microphone 612 in a fourth location on the right stem 704, and a sixth microphone 614 in a sixth location on a lower portion of the right frame 610.

The lower portions of the left frame 608 and right frame 610 may be the undersides of the frames, as shown in FIG. 6, or may be some other portions of the frames that are lower than the respective stems in some examples.

A wearer speech location 602 is shown in FIG. 6, roughly corresponding to a region in front of the wearer's mouth and nose when wearing the head-wearable apparatus 116. The wearer speech location 602 represents a region of space where sound originates when the wearer is speaking.

The microphones 338 shown in FIG. 6 are spatially separated from each other such that a spatial vector passing through at least one pair of the microphones passes through the wearer speech location 602. For example, left diagonal spatial vector 618 passes through the first microphone 604 and third microphone 606 to intersect the wearer speech location 602, and right diagonal spatial vector 616 passes through the fourth microphone 612 and sixth microphone 614 to intersect the wearer speech location 602. In this way, sound originating from the wearer speech location 602 is likely to register at the pair of microphones (604 and 606, or 612 and 614) as acoustic signals with similar acoustic properties but at a fixed time delay relative to each other due the spatial separation between the microphones. This spatial configuration of the microphones may provide enhanced accuracy in performing bystander speech rejection in accordance with techniques described herein.

Figure 7:
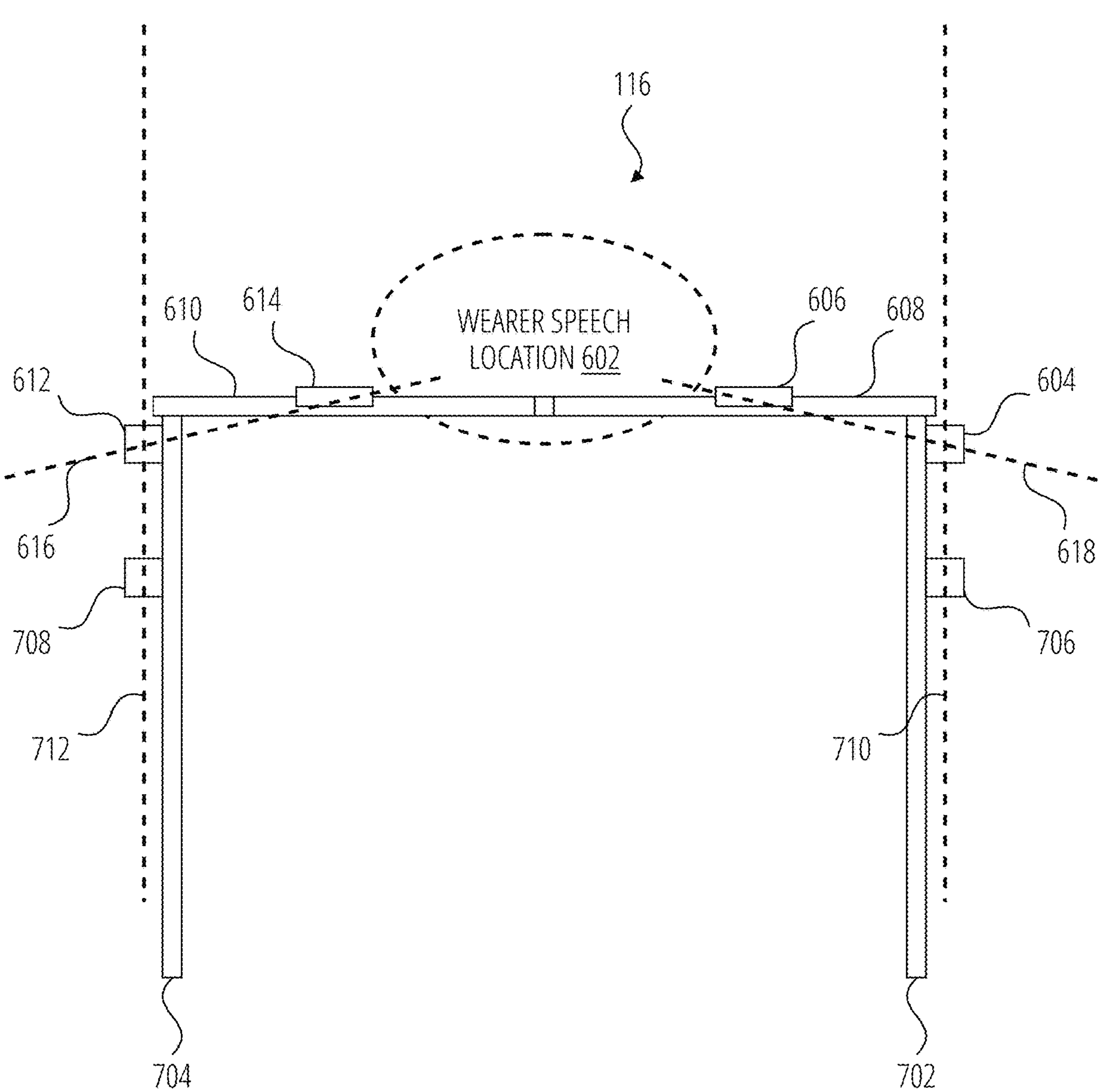
FIG. 7 is a bottom view of the augmented reality glasses and wearer speech location of FIG. 6.

FIG. 7 is a bottom view of the head-wearable apparatus 116 of FIG. 6, showing the horizontal spatial relationships between the microphones 338 and the wearer speech location 602. The left stem 702 and right stem 704 of the head-wearable apparatus 116 can be seen extending backward from the frames 608, 610. In addition to the four microphones 604, 606, 612, 614 shown in FIG. 6, FIG. 7 also shows second microphone 706 in a second location on the left stem 702, behind the location of the first microphone 604; and fifth microphone 708 in a fifth location on the right stem 704, behind the location of the fourth microphone 612.

The right diagonal spatial vector 616 and left diagonal spatial vector 618 can be seen passing through the wearer speech location 602, which is illustrated as being roughly at or in front of the wearer's mouth opening, and potentially encompassing the wearer's nose openings.

FIG. 7 also shows a left forward spatial vector 710 passing through the second microphone 706 and first microphone 604, and a right forward spatial vector 712 passing through the fifth microphone 708 and fourth microphone 612. These forward spatial vectors 710, 712 are substantially aligned with the wearer's line of sight, such sounds originating from an object at the center of the wearer's field of vision is likely to register at the pairs of microphones aligned with these vectors (706 and 604, and 708 and 612) register as acoustic signals with similar acoustic properties but at a fixed time delay relative to each other due the spatial separation between the microphones. This spatial configuration of the microphones may provide enhanced accuracy in performing various directional sound processing techniques, such as those described herein.

It will be appreciated that the configuration of the microphones can be varied in different examples. In some examples, the head-wearable apparatus 116 includes a different number of microphones, such as four microphones. In some examples, the diagonal spatial vectors passing through the wearer speech location 602 pass through the rear stem microphones (i.e., second microphone 706 and fifth microphone 708) instead of the front stem microphones (i.e., first microphone 604 and fourth microphone 612). In some examples, the head-wearable apparatus 116 includes additional microphones in additional locations, such as additional locations on the frames 608, 610.

Figure 8:
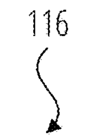
FIG. 8 is the bottom view of the augmented reality glasses of FIG. 7, illustrating a set of spatial separations between the microphones of the augmented reality glasses.
Figure 8:
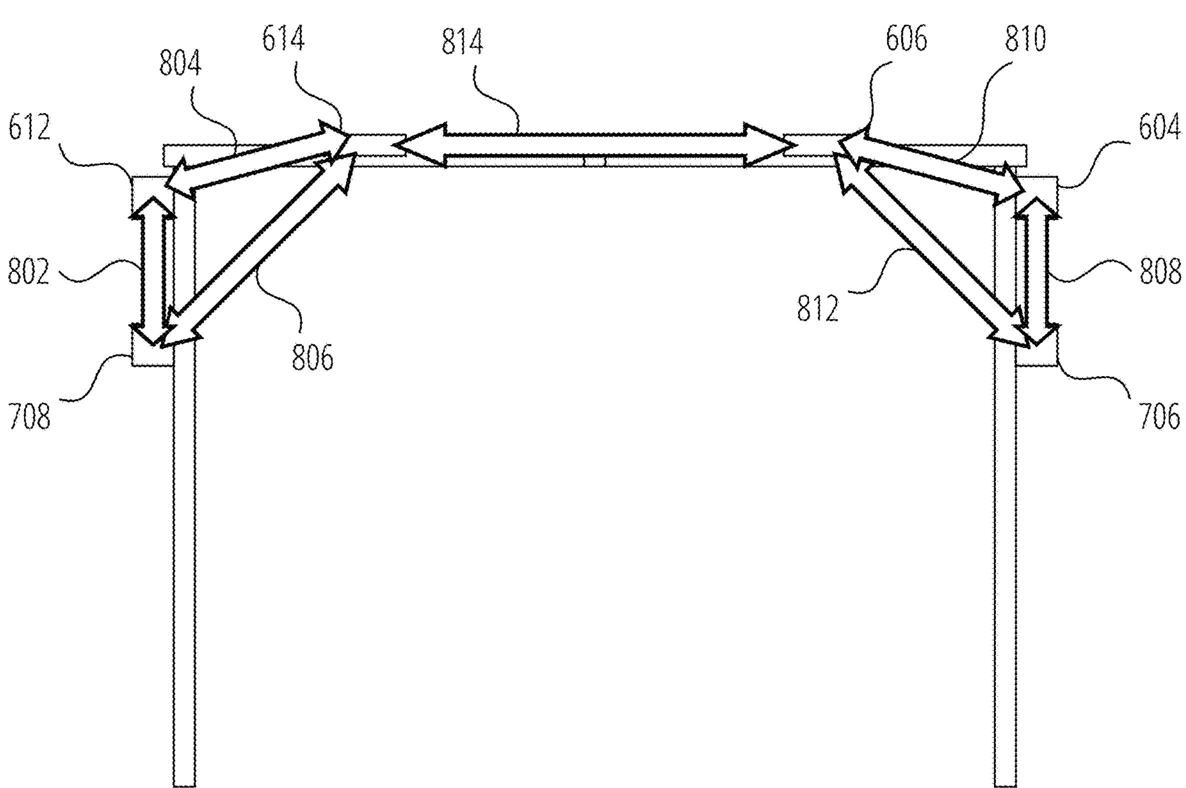

FIG. 8 is the same bottom view of the head-wearable apparatus 116 shown in FIG. 7, illustrating an example set of spatial separations between the pairs of microphones. On the left hand side of the head-wearable apparatus 116, first microphone 604 and second microphone 706 are separated by separation 808; first microphone 604 and third microphone 606 are separated by separation 810; and second microphone 706 and third microphone 606 are separated by separation 812. On the right hand side of the head-wearable apparatus 116, fourth microphone 612 and fifth microphone 708 are separated by separation 802; fourth microphone 612 and sixth microphone 614 are separated by separation 804; and fifth microphone 708 and sixth microphone 614 are separated by separation 806. Furthermore, the left hand and right hand side microphones are separated by a further set of known separations, such as separation 814 between third microphone 606 and sixth microphone 614.

It will be appreciated that FIG. 7 shows only horizontal spatial relationships among the microphones; the separations among the microphones may also include a vertical component, e.g., as shown in FIG. 6. For example, the third microphone 606 and sixth microphone 614, located on a lower portion of their respective frames 608 and 610, are vertically separated from, and lower than, the stem microphones 604, 606, 706, 708 in the illustrated example.

By using a head-wearable apparatus 116 having microphones separated by a known set of spatial separations, example techniques described herein may be able to reliably detect and reject non-wearer speech (also called "bystander speech") when determining whether to act upon a voice command, or otherwise determine whether a sound detected by the microphones corresponds to speech by the wearer of the head-wearable apparatus 116.

Figure 9:
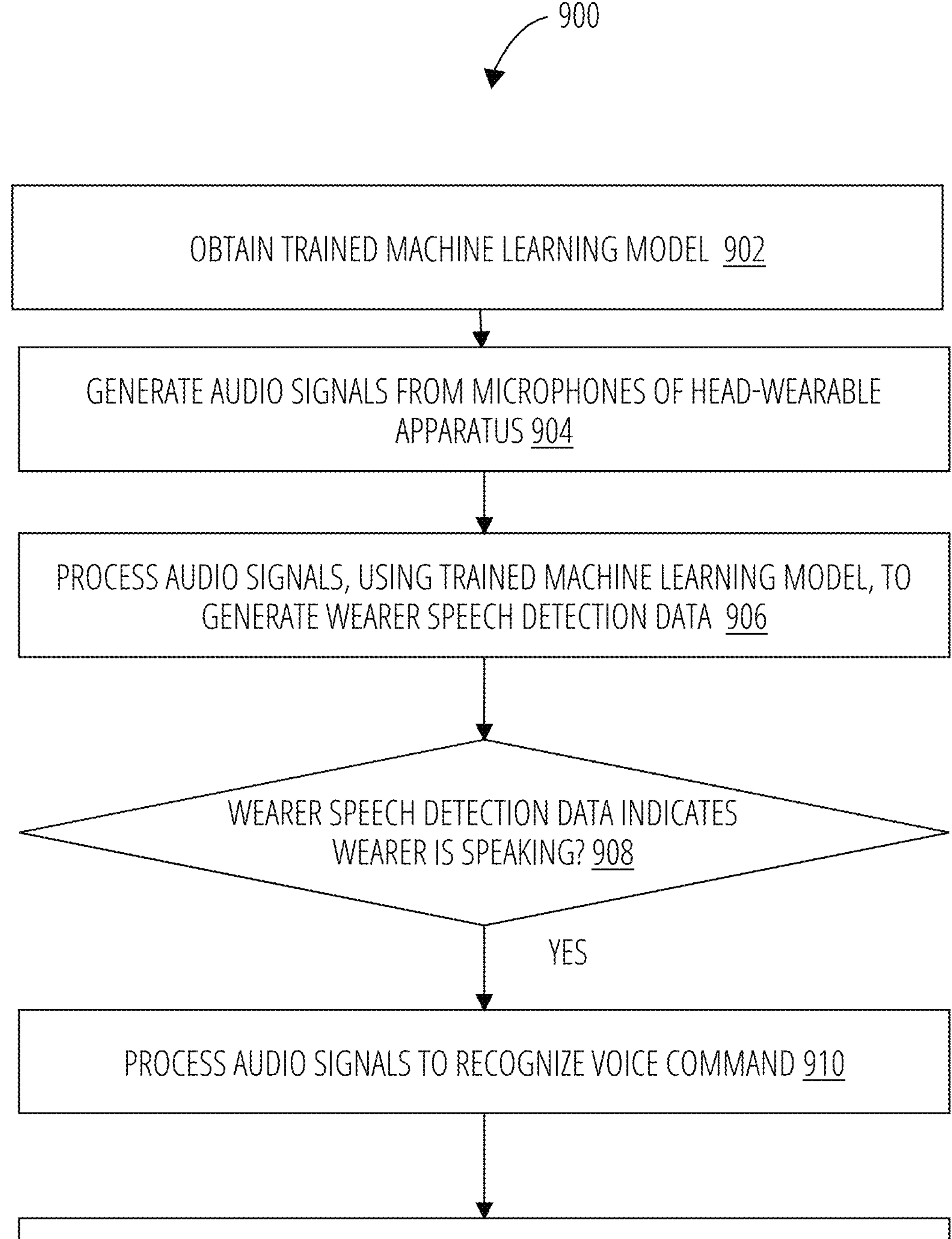
FIG. 9 is a flowchart showing operations of a method for bystander speech command rejection, according to some examples.

FIG. 9 shows operations of an example method 900 for detecting non-wearer speech and thereby rejecting non-wearer speech commands. Each operation of method 900 is performed by the head-wearable apparatus 116 and/or one or more devices in communication with the head-wearable apparatus 116 (such as a device of interaction system 100), such that the method 900 can be performed in real time, based on audio signals generated by the microphones 338 of the head-wearable apparatus 116, to accept or reject speech commands detected in the acoustic environment of the head-wearable apparatus 116. For example, the operations of method 900 may be performed by one or more of: the head-wearable apparatus 116, the mobile device 114, the computer client device 118, and/or one or more devices of the interaction server system 110. However, it will be appreciated that method 900 can be performed by various configurations of one or more devices capable of real-time computation and interaction.

Although the example method 900 depicts a particular sequence of operations, the sequence may be altered without departing from the scope of the present disclosure. For example, some of the operations depicted may be performed in parallel or in a different sequence that does not materially affect the function of the 900. In other examples, different components of an example device or system that implements the 900 may perform functions at substantially the same time or in a specific sequence.

According to some examples, the method includes obtaining a trained machine learning model at operation 902. The trained machine learning model is trained to classify sounds registered by an array of spatially separated microphones as being wearer speech sounds or not wearer speech sounds, thereby indicating a likelihood that the wearer is speaking based on sounds registered by the microphones of the head-wearable apparatus 116. An example implementation of a training method 1100 for obtaining a trained machine learning model is described below with reference to FIG. 11.

According to some examples, the method includes generating audio signals from the microphones 338 of the head-wearable apparatus at operation 904. The microphones 338 (e.g., microphones 604, 606, 706, 708, 612, 614) generate the audio signals based on sound detected in the environment, which may include speech by the wearer of the head-wearable apparatus 116, speech by someone other than the wearer (a “bystander”), and/or non-speech sounds such as background noise. In examples using a head-wearable apparatus 116 having six microphones, the audio signals collectively define six-channel audio data. In some examples, only a subset of the microphones of the head-wearable apparatus 116 are used to generate audio signals at operation 902. For example, the head-wearable apparatus 116 may only need to rely on a subset of its microphones in order to reliably reject bystander speech in some examples, and in some such examples the head-wearable apparatus 116 may include one or more redundant microphones in order to provide robustness against hardware failure or other faults.

According to some examples, the method includes processing the audio signals generated at operation 904, using the trained machine learning model obtained at operation 902, to generate wearer speech detection data at operation 906. The wearer speech detection data is representative of a likelihood that a wearer of the head-wearable apparatus is speaking. By training a machine learning model to distinguish between speech by a wearer of the head-wearable apparatus 116 and other sounds, based on multi-channel audio inputs corresponding to directional sounds as recorded by an array of microphones having a known set of spatial separations (e.g., as shown in FIG. 7), a system including the head-wearable apparatus 116 may reliably and efficiently distinguish between sounds that represent speech by the wearer and other sounds, thereby preventing bystanders from triggering voice commands of the system.

Some examples may use a machine learning model trained (e.g., by method 1100) to process audio inputs having a smaller number of channels than the number of microphones included in the head-wearable apparatus 116, e.g., only four channels instead of six channels, such that the failure of one or two microphones out of a six-microphone array still results in sufficient spatial audio data to reliably perform bystander speech rejection.

According to some examples, the method includes determining whether the wearer speech detection data indicates that the wearer is speaking at operation 908. If the wearer speech detection data indicates a high likelihood that the wearer of the head-wearable apparatus 116 is speaking, then the method proceeds to operation 910. Otherwise, the audio signals may be ignored, or in some examples the audio signals may be propagated to a different subsystem or propagated for further processing in association with further data indicating that they do not encode speech by the wearer of the head-wearable apparatus 116. As described above, a likelihood threshold or permissiveness value for the bystander rejection functionality of the system can be used to determine whether the wearer speech detection data satisfies a condition required to propagate the audio signals upstream to be processed for the activation of voice commands.

According to some examples, the method includes processing the audio signals to recognize a voice command at operation 910. Processing of audio data to recognize voice commands may be performed according to any of a number of known techniques for detecting and acting upon voice commands.

According to some examples, the method includes activating a software command of the system based on the voice command at operation 912. A predetermined software command of the system corresponding to a predetermined voice command may be triggered when that voice command is recognized in the audio signals.

The decision of the system whether or not to trigger the software command at operation 910 may be predicated on a likelihood threshold or other metric calibrated to trade off between false positives (i.e., triggering a voice command when the wearer is not speaking) and false negatives (i.e., not triggering a voice command when the wearer is speaking). In many contexts, the system will set the likelihood threshold very high to reduce the number of false positives to zero or near zero, as false positives can constitute a security risk, whereas false negatives typically constitute only a usability issue. The likelihood threshold may be referred to herein as the “permissiveness” of the system, wherein high permissiveness indicates a low likelihood threshold (i.e., relatively more false positives and fewer false negatives).

Figure 10:
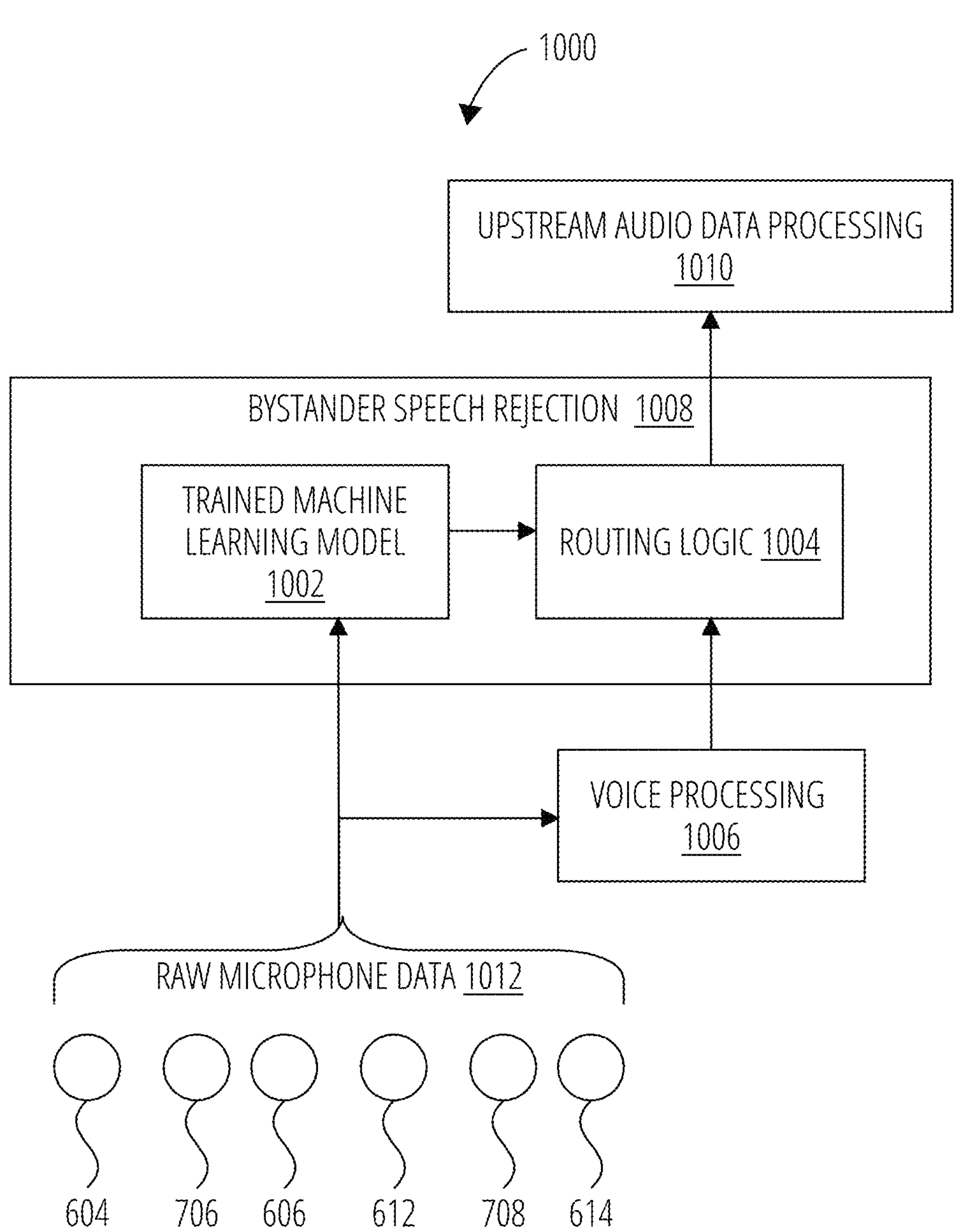
FIG. 10 is a block diagram illustrating an example of flow of data through functional modules of a system implementing the method of FIG. 9.

FIG. 10 illustrates an example of the flow of data through functional modules of a system 1000 implementing method 900. The system illustrated in FIG. 10 can be implemented by one or more functional modules of one or more devices, such as the audio processing system 232 of the interaction system 100.

The system 1000 receives raw microphone data 1012 from the six microphones 604, 606, 612, 614, 706, 708. The raw microphone data 1012 is processed in parallel by a voice processing module 1006 and a bystander speech rejection module 1008.

The voice processing module 1006 is configured to process audio data to detect and recognize speech. The voice processing module 1006 generates an output, such as a cleaned-up speech signal with non-speech sounds filtered or diminished, a set of linguistic tokens, and/or other outputs of speech recognition.

In some examples, the voice processing module 1006 may include a voice activity detection (VAD) sub-module for detecting human speech in the raw microphone data 1012, which can act as a further filter to prevent activation of voice commands by sounds other than the wearer's speech. However, VAD functionality is typically insufficient to distinguish between wearer speech and bystander speech. Furthermore, as described below in reference to the results of experimental testing, some implementations of bystander speech rejection methods in accordance with techniques described herein are sufficient to distinguish wearer speech from other sounds with a high degree of reliability, thereby rendering VAD unnecessary as an additional filter to address the security and privacy protection purposes described above. Nonetheless, use of VAD in conjunction with bystander speech rejection techniques described herein may confer other benefits in some contexts, such as detecting bystander speech to be processed by functions of the system 1000 other than a voice command function. In some examples, the voice processing module 1006 can include a lookahead feature to compensate for inference time of the trained machine learning model 1002, and/or to allow a potential trigger word utterance to be processed including audio data from a time period before the inference window. For example, the time period before the inference window can include between 500 milliseconds (ms) and 1000 ms of buffered microphone lookahead data (e.g., raw microphone data 1012).

The bystander speech rejection module 1008 includes a trained machine learning model 1002, which receives the raw microphone data 1012 as input, e.g., as six-channel or four-channel audio data. In some examples, the raw microphone data 1012 is pre-processed before being provided to the trained machine learning model 1002: for example, each channel of raw microphone data 1012 may be converted into a spectrogram, thereby enabling the processing of each channel of audio data by the trained machine learning model as a two-dimensional image and thereby leveraging known computer vision techniques in machine learning. Example techniques for preprocessing audio data used as inputs to the machine learning model are described in greater detail below with reference to FIG. 14.

The trained machine learning model 1002 generates a wearer speech detection data output (e.g., classification information in the form of a prediction, probability distribution across classes, or set of logits) based on the raw microphone data 1012 inputs. Routing logic 1004 receives the wearer speech detection data and the output of the voice processing module 1006. If the wearer speech detection data satisfies the likelihood threshold, permissiveness metric, or other metric used by the system 1000, then the output of the voice processing module 1006 is routed by the routing logic 1004 to an upstream audio data processing module 1010 for further processing of voice commands issued by the wearer. In some examples, even if the wearer speech detection data fails to satisfy the metric for treatment as a voice command, the output of the voice processing module 1006 may be propagated by the routing logic 1004, along with additional information indicating that the speech data generated by the voice processing module 1006 does not correspond to speech by the wearer, thereby enabling the upstream audio data processing module 1010 to use this speech data for purposes other than interpretation as a voice command.

In some examples, the upstream audio data processing module 1010 is or includes a natural language understanding (NLU) and/or automatic speech recognition (ASR) engine. In some such examples, the voice processing module 1006 may operate to recognize and/or isolate voice sounds, but not to recognize the content of speech.

In some examples, the trained machine learning model 1002 and/or the voice processing module 1006 can include additional filters or guard rails to automatically reject certain sounds, such as any sound below a volume threshold.

In some examples, the system 1000 is operable to conserve power and/or computational resources in an environment that includes frequent bystander speech and/or other background noises. Because the upstream audio data processing module 1010 is only prompted to process wearer speech for the purpose of recognizing voice commands, the power and computational resources required to recognize voice commands can be significantly reduced in any environment presenting sounds that are not wearer speech.

Figure 11:
FIG. 11 is a flowchart showing operations of a method for training a machine learning model to perform bystander speech command rejection, according to some examples.
Figure 11:
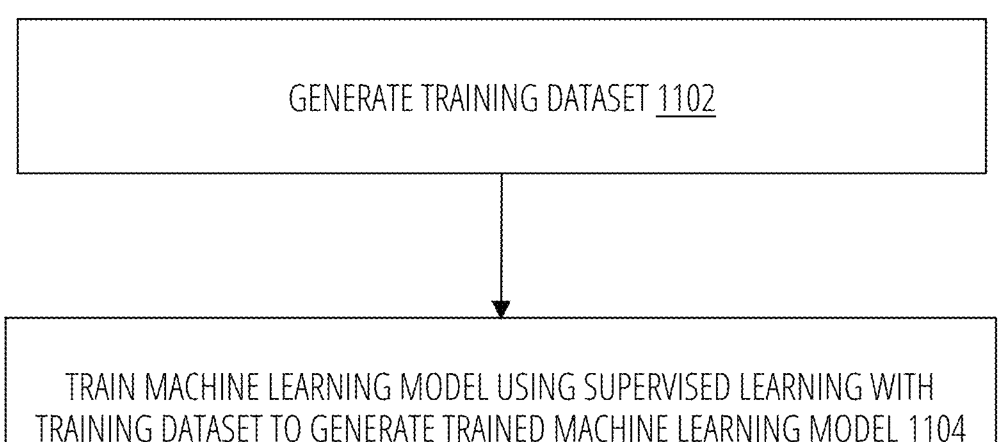

FIG. 11 shows operations of an example method 1100 for training a machine learning model to perform bystander speech command rejection. Both training method 1100, as well as training data generation method 1200 described below with reference to FIG. 12, may be performed on a machine (e.g., machine 400) that is not in real-time communication with the head-wearable apparatus 116. Instead, these methods 1100, 1200 may be performed on a training system or machine 400, and the trained machine learning model 1002 generated thereby can be copied and loaded into the memory of a device used in the performance of method 900, e.g., a device included in interaction system 100. However, in some examples, one or more of the devices included in interaction system 100 can be used to train the machine learning model and/or generate the training dataset therefor.

Although the example method 1100 depicts a particular sequence of operations, the sequence may be altered without departing from the scope of the present disclosure. For example, some of the operations depicted may be performed in parallel or in a different sequence that does not materially affect the function of the method 1100. In other examples, different components of an example device or system that implements the method 1100 may perform functions at substantially the same time or in a specific sequence.

According to some examples, the method 1100 includes obtaining a training dataset at operation 1102. An example method 1200 of generating a training dataset is shown in the flowchart of FIG. 12, described below.

According to some examples, the method includes training a machine learning model using supervised learning with the training dataset obtained at operation 1102 to generate trained machine learning model at operation 1104. Examples of machine learning models and supervised learning techniques are described in greater detail below with reference to FIG. 14. It will be appreciated that some examples may use training techniques other than supervised learning to train the machine learning model.

Figure 12:
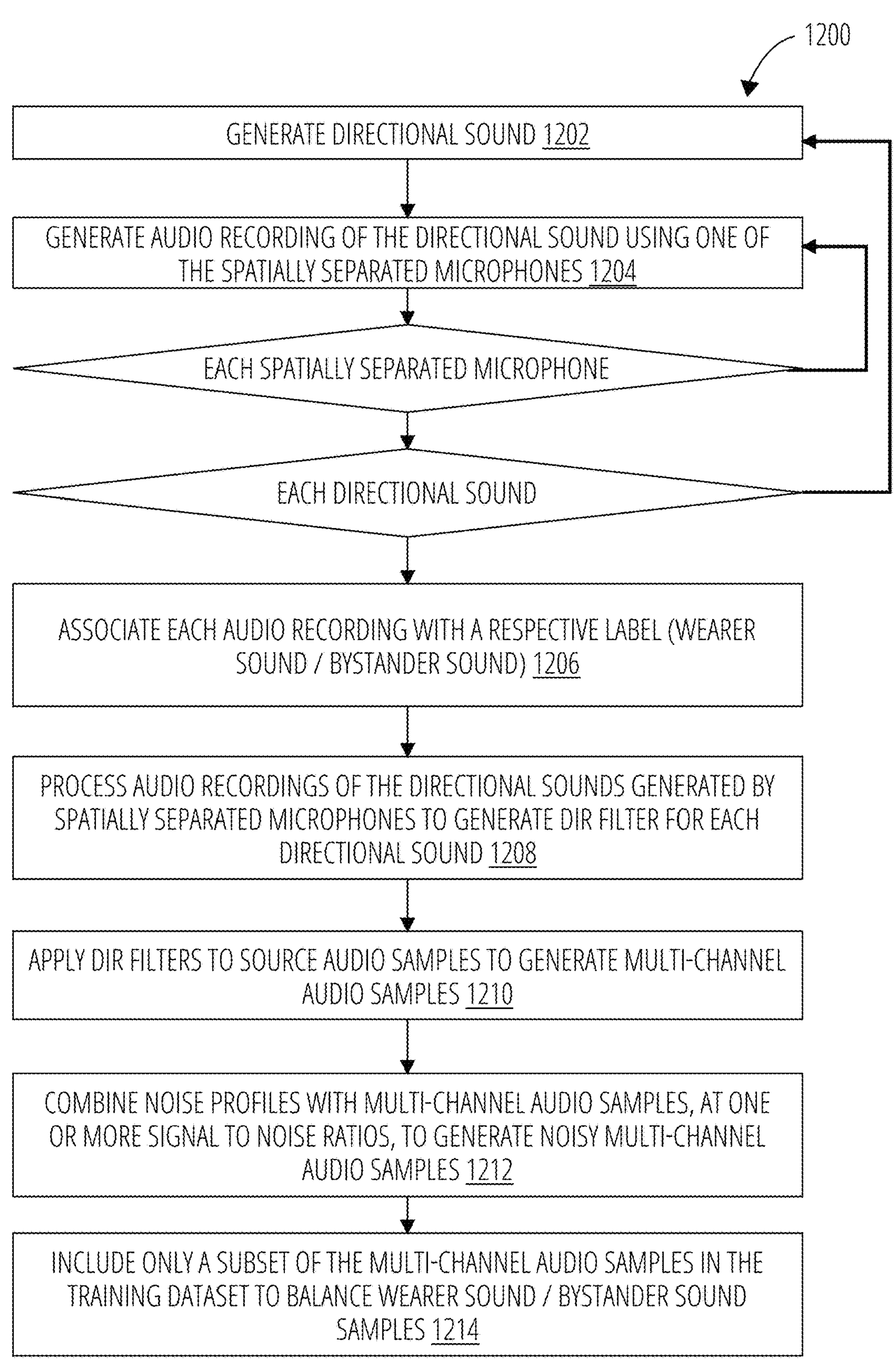
FIG. 12 is a flowchart showing operations of a method for generating a training dataset for training a machine learning model to perform bystander speech command rejection, according to some examples.

FIG. 12 shows operations of an example method 1200 for generating a training dataset for training a machine learning model to perform bystander speech command rejection. FIG. 12 will be described jointly with FIG. 13 and FIG. 14 to better illustrate example techniques for generating training data and using the training data to train the machine learning model, thereby providing a trained machine learning model 1002 for performing the functions thereof described above with reference to method 900 and system 1000.

Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

Operations 1202 through 1204 are repeated for each of a plurality of directional sounds, and will be described jointly in reference to FIG. 13. Operations 1206 through 1214 will be described jointly in reference to FIG. 14.

Figure 13:
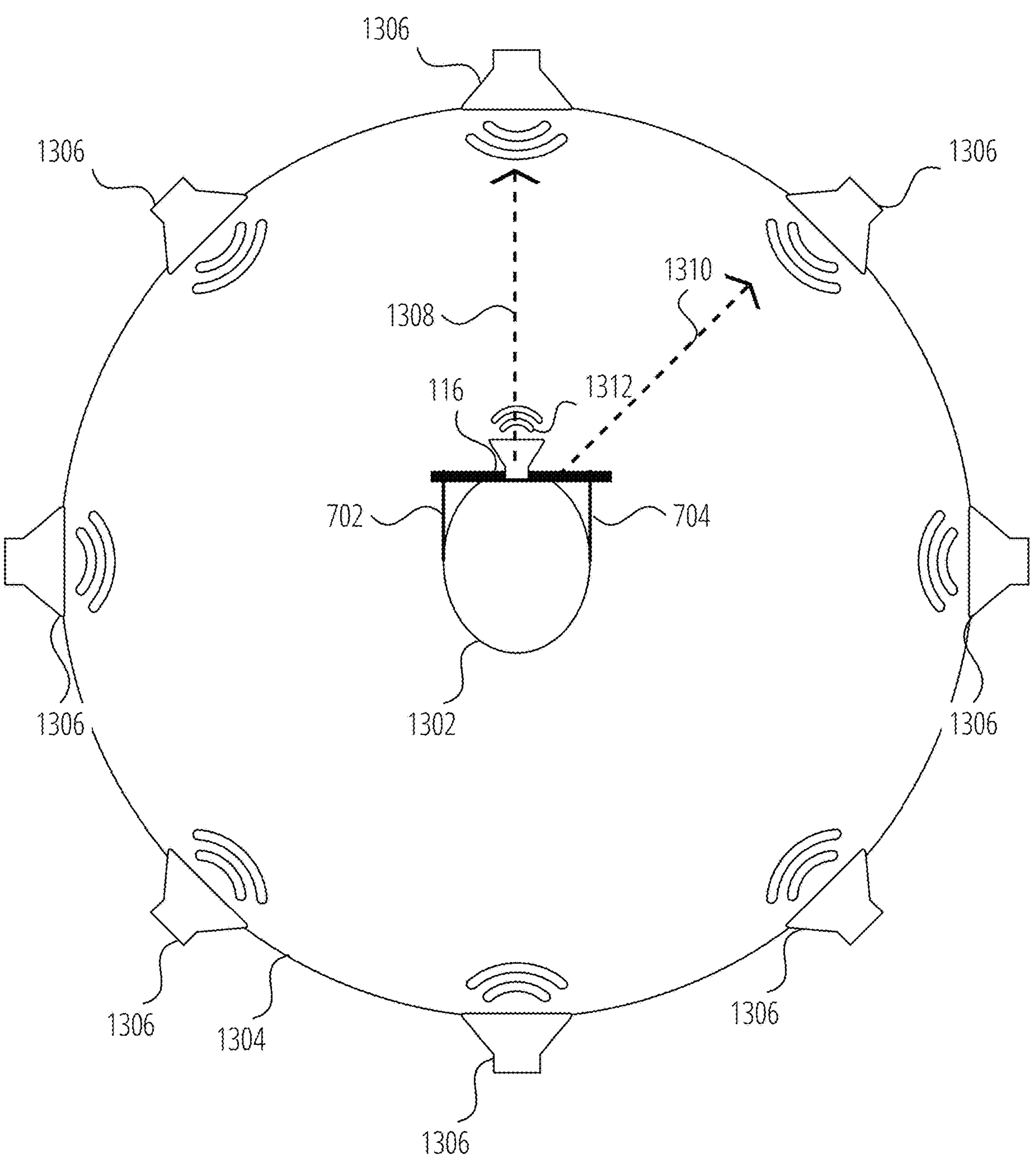
FIG. 13 is a simplified top view of a configuration of sound sources for recording of directional sounds by an array of spatially separated microphones, according to some examples.

FIG. 13 shows a configuration of sound sources for recording of directional sounds by an array of spatially separated microphones, in accordance with operations 1202 through 1206 of method 1200.

An array of spatially separated microphones is situated at the center of a recording configuration. In the illustrated example, a specimen of the head-wearable apparatus 116 itself provides the array of spatially separated microphones. However, in some examples, microphones may be arranged in a set of spatial separations from each other to replicate the spatial separations of the microphones of the head-wearable apparatus 116, e.g., as shown in FIG. 8. The microphones used for the array of spatially separated microphones may share the operating parameters of the microphones used by the head-wearable apparatus 116 such that their output matches; this may enhance the performance of the machine learning model trained using the outputs of the array of spatially separated microphones when deployed as a trained machine learning model 1002 in connection with the head-wearable apparatus 116.

In some examples, various physical objects may be used in the audio recording configuration to simulate or replicate the expected acoustic conditions to be encountered by the microphones of the head-wearable apparatus 116. For example, a head-shaped object 1302 simulating the shape and acoustic properties of the wearer's head may be used to mount an actual or replica head-wearable apparatus 116 that replicates the physical properties and surfaces thereof (e.g., frames 608 and 610 and stems 702 and 704 for mounting the microphones). In some examples, a Head And Torso Simulator (HATS) may be used for such testing, to also simulate the acoustic reflections off of the wearer's torso, which can also affect the transfer function.

Each directional sound is generated by a respective sound source to originate from a different direction relative to the array of spatially separated microphones. E.g., a first sound source 1306 originating a first directional sound is located in a first direction 1308 from the array of spatially separated microphones, and a second sound source 1306 originating a second directional sound is located in a second direction 1310 from the array of spatially separated microphones. Whereas the recording configuration shown in FIG. 13 is a simplified representation showing only eight sound sources 1306, in some examples the number of different directional sounds may be much higher, such as 72 directional sounds in 72 different directions (e.g., a directional sound originating from each of 72 points around circle 1304, each point being separated by an arc of 5 degrees).

The directional sounds originating from the sound sources 1306 located around circle 1304 can be considered to correspond to bystander sounds originating from directions corresponding to locations other than the wearer speech location. In addition to these bystander sounds, one or more wearer sounds are also generated, originating from a wearer speech sound source 1312 located in a direction corresponding to the wearer speech location 602 (e.g., where the wearer's mouth opening would be located relative to the array of spatially separated microphones).

The directional sounds (i.e., bystander sounds and wearer sounds) are generated one at a time, with the array of spatially separated microphones recording each directional sounds as multi-channel audio data. Thus, according to some examples, the method 1200 includes generating a directional sound at operation 1202, generating an audio recording of the directional sound using one of the spatially separated microphones at operation 1204, repeating operation 1204 for each additional microphone in the array of spatially separated microphones, and then returning to operation 1202 to record the next directional sound until all directional sounds (e.g., 72 bystander sounds and one wearer sound for a total of 73 directional sounds) have been recorded. After the final iteration of operations 1202 through 1204, a plurality of audio recordings of directional sounds have been generated. For example, in a recording configuration using 73 directional sounds and an array of spatially separated microphones consisting of six microphones, the total number of audio recordings of directional sounds is (73×6=438) 438 audio recordings.

It will be appreciated that, whereas the simplified view of FIG. 13 shows sounds sound sources 1306 displaced from each other and the array of spatially separated microphones within a horizontal plane, some examples may also displace one or more of the sound sources 1306 vertically to generate audio data originating from elevations above or below the elevation of the array of spatially separated microphones.

Figure 14:
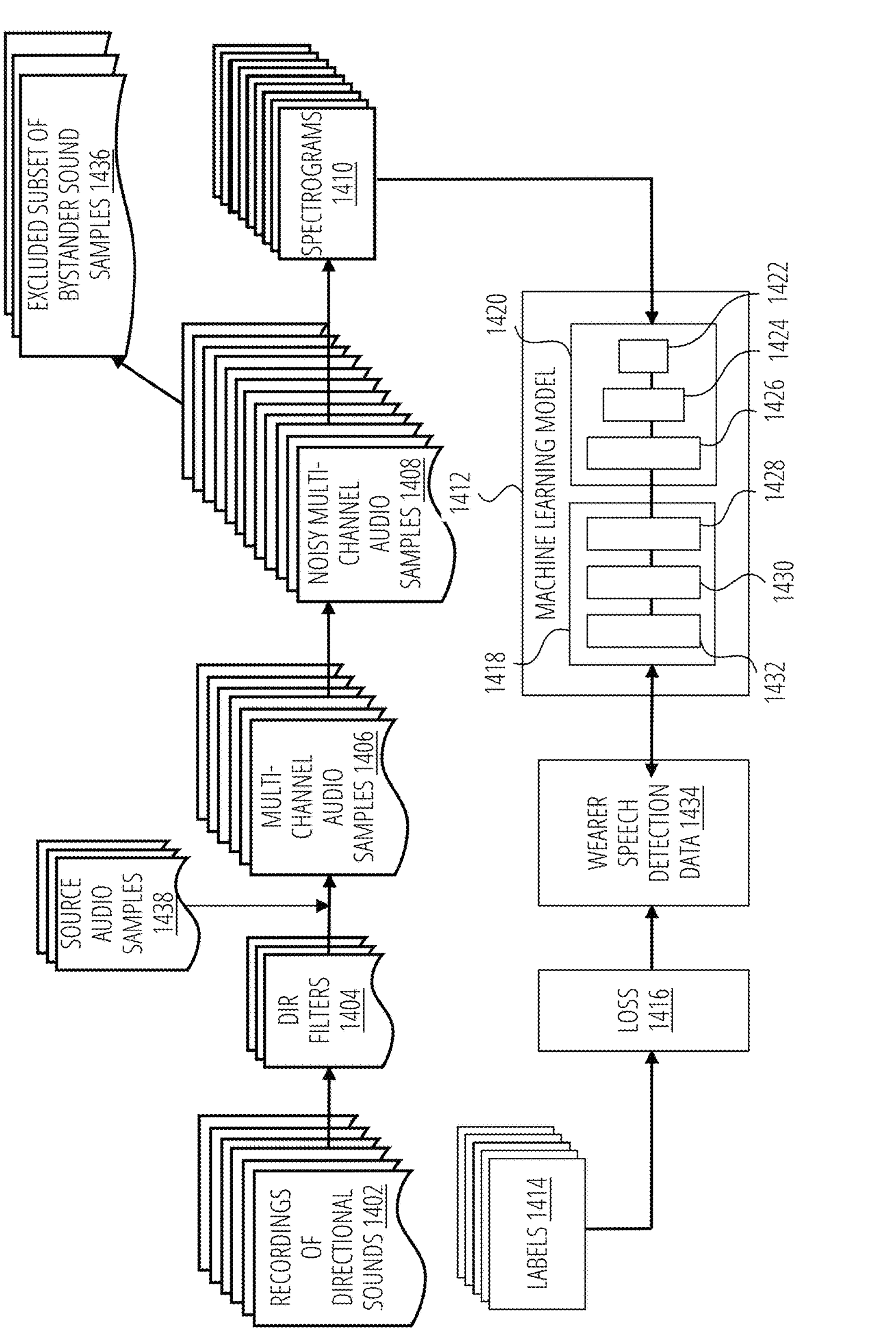
FIG. 14 is a block diagram illustrating the inputs and outputs of the data processing and training operations of the methods of FIG. 11 and FIG. 12.

FIG. 14 shows the inputs and outputs of the data processing and training operations of the training data generation method of FIG. 12 and the training operation of FIG. 11. The training dataset is generated and used to train the machine learning model 1412. The set of data processing operations, inputs, and outputs shown in FIG. 14 may be referred to herein as a data pipeline.

According to some examples, the method 1200 includes associating the recordings of directional sounds 1402 with respective labels 1414, representative of whether the recorded sound is a wearer sound or not a wearer sound, at operation 1210. In various examples, the labels 1414 may indicate the specific direction (e.g. 1308, 1310) of the recorded sound for each recording, or may simply indicate whether the direction of the sound is the direction of the wearer speech location: i.e., the label contains ground truth information about the audio recording of the directional sound sufficient to indicate whether the sound is a wearer sound or a bystander sound. The information in the labels 1414 is generated based on the identity of the sound source 1306 used to generate each recorded sound in the recording configuration of FIG. 13. These labels 1414 remain associated with the various data samples generated in the data pipeline shown in FIG. 14: i.e., each of the DIR filters 1404, multi-channel audio samples 1406, noisy multi-channel audio samples 1408, and spectrograms 1410 is associated with a respective label corresponding to the label of the recording of the directional sound from which it originated.

According to some examples, the method 1200 includes, at operation 1208, processing the audio recordings of directional sounds 1402 generated by the array of spatially separated microphones at operations 1202 through 1204 to generate, for each directional sound (e.g., 6-channel audio data for 73 directional sounds, represented by 438 audio recordings), a corresponding directional impulse response (DIR) filter 1404 (e.g., 73 DIR filters). The DIR filters 1404 can be generated from the multi-channel audio recordings of the directional sounds 1402 using known techniques. In some examples, each directional sound is a uniform acoustic stimulus configured to assist in generation of a DIR filter 1404 for each direction (e.g., 1308, 1310, and so on) representing a directional impulse response profile characteristic of sound from the given direction registered by the array of spatially separated microphones.

An impulse response is the output of a dynamic system when given an impulse as an input. In the case of a directional impulse response of an acoustic system, the directional impulse response (DIR) is indicative of what happens to sound when it goes from one space to another.

According to some examples, the method 1200 includes applying the DIR filters 1404 to a set of source audio samples to generate a set of multi-channel audio samples 1406 at operation 1210. The source audio samples 1438 may include various sounds, including speech sounds and non-speech sounds, to be used in training the machine learning model 1412. In some examples, some of the speech sounds may correspond to known voice commands, such that the machine learning model 1412 can be trained using voice commands that will be encountered in practice. A DIR filter can be applied to an audio sample using convolution to simulate sound arriving at the array of spatially separated microphones from particular directions (e.g., directions 1308, 1310, etc.). In the illustrated example of FIG. 13, a source audio sample can be designated as N (z), the audio signal to be generated as the first audio channel (corresponding to the first microphone 604) can be designated as $M_1(z)$, and the audio signal to be generated as the second audio channel (corresponding to the second microphone 706) can be designated as $M_2(z)$. The DIR filter associated with the sound source 1306 at first direction 1308 can be designated as $H_1(z)$ for the first channel and $H_2(z)$ for the second channel, each denoting a frequency domain transform of the measured impulse response of the first microphone 604 and second microphone 706, respectively, of the directional sound originating from the sound source 1306 at first direction 1308. Thus, by applying the DIR filter to the source audio sample, a first audio channel $M_1(z)=H_1(z)N(z)$ and a second channel $M_2(z)=H_2(z)N(z)$ can be generated, as well as any other audio channels corresponding to microphones in the array of spatially separated microphones.

By applying the DIR filters 1404 to the source audio samples 1438, each source audio sample can be transformed into a set of multiple multi-channel audio samples 1406, up to one for each direction in the set of directional sounds. Thus, if the source audio samples 1438 constitute a library of 1,000 sounds to be used in training, and there are 73 DIR filters 1404 corresponding to 73 directional sounds, operation 1208 may result in the generation of 73,000 distinct multi-channel audio samples 1406, representative of a multi-channel recording of each source audio sample originating from a different direction, as that sound would be recorded by the array of spatially separated microphones (and so, analogously, by the microphones of the head-wearable apparatus 116). In some examples, the source audio samples 1438 are audio samples of fixed durations, such as 0.01, 0.1, 0.2, 0.5, or 1 second.

According to some examples, the method 1200 includes combining noise profiles with the multi-channel audio samples 1406, at one or more signal to noise ratios, to generate noisy multi-channel audio samples 1408 at operation 1212. In some examples, a set of multiple noise profiles is provided, such as five distinct noise profiles intended to simulate noisy environments likely to be encountered by the head-wearable apparatus 116. The multi-channel audio samples 1406 are mixed with each of these noise profiles separately to generate a further set of noisy multi-channel audio samples 1408, e.g., 73,000 multi-channel audio samples 1406 mixed with five noise profiles to generate 365,000 noisy multi-channel audio samples 1408. In some examples, multiple noisy multi-channel audio samples 1408 are generated for each mix, corresponding to multiple signal to noise (SNR) ratios, i.e. ratios of the amplitude or gain of the underlying multi-channel audio sample to the amplitude or gain of the noise profile. For example, three different SNR values may be used, such as 4, 12, and 100: in this example, five noise profiles mixed at three SNR values with 73,000 multi-channel audio samples would result in 1,095,000 noisy multi-channel audio samples 1408.

In some examples, one or more additional operations (not shown) may be performed to further pre-process the training dataset. For example, in some examples, the DIR filters 1404 may be randomly perturbed across the various audio samples to which they are applied, to avoid an outcome in which the trained model overfits its predictions to the specific idiosyncrasies of the specific set of DIR filters 1404 used to generate the training data. For example, random left/right delay time warping can be used to perturb the DIR filters 1404, thereby generating additional DIR filters that can also be used to generate training data as described above. In some examples, the various audio samples may be shortened (e.g., trimmed from an original duration to a fixed duration as described herein), resampled (e.g., to normalize all samples to the same standard), amplified (e.g., doubled in volume to amplify any differences between samples), and/or processed using other pre-processing operations. In some cases, the training dataset can also include additional bystander sound samples generated by recording sounds emanating from the speaker hardware of the user system 102. These training data samples may assist the machine learning model in learning to distinguish wearer sounds from sounds generated by the user system 102.

According to some examples, the method 1200 includes including only a subset of the multi-channel audio samples 1406 in the training dataset to balance wearer sound and bystander sound samples at operation 1214. Out of the full set of noisy multi-channel audio samples 1408, the number of bystander sounds will typically outnumber the number of wearer sounds by a significant ratio, e.g., 72:1 in the ongoing example described above. When training a classifier using machine learning, it can be desirable to balance the number of training samples belonging to each class so as to avoid an outcome in which the classifier becomes biased toward the safe but trivial prediction of every input belonging to the class most prevalent in the training dataset. Thus, it may be desirable for the number of wearer sounds (e.g., noisy multi-channel audio samples 1408 associated with a label indicating a wearer sound) included in the training dataset to be substantially equal to the number of bystander sounds in the training dataset.

An excluded subset of bystander sound samples 1436 may therefore be excluded from the ultimate training dataset, in order to reduce the ratio of bystander sounds to wearer sounds from a high initial value (e.g., 72:1) to a lower value closer to or equal to 1:1. The excluded subset of bystander sound samples 1436 can be selected randomly, or based on a metric or heuristic that excludes samples to improve the balance or distribution of various types of data samples in the ultimate training dataset along other dimensions than (wearer sound/bystander sound). In some examples, the excluded subset of bystander sound samples 1436 are identified by, for each bystander sound sample, generating a random number between 0 and 1 and only including the sample is the random number is below a desired inclusion ratio 1/N, wherein N is the number of non-wearer sound source locations (e.g., 72). Thus, if the initial ratio of wearer sounds to bystander sounds is 1:72, each bystander sound is only included if its respective random number is below 1/72. In this way, on average, the ratio of wearer sounds to bystander sounds included in the training dataset approaches 1:1.

It will be appreciated that, in some examples, it may be more efficient to select and exclude the excluded subset of bystander sound samples 1436 at an earlier stage of the data pipeline shown in FIG. 14, so as to avoid unnecessarily processing and generating large volumes of data that will later be excluded. Thus, in some examples, the excluded subset of bystander sound samples 1436 represents data samples that are never generated: for example, a first subset of DIR filters may not be applied to a second subset of the recordings of directional sounds 1402 at operation 1210, and/or a first subset of multi-channel audio samples 1406 may not be mixed with a second subset of noise profiles at a third subset of SNR ratios at operation 1212, and so on. By excluding, or not generating, some subset of data samples corresponding to bystander sounds, the training data set can be balanced across the predicted classes and the training dataset generation method 1200 may also be performed efficiently, thereby conserving power and/or computational resources.

In some examples, the noisy multi-channel audio samples 1408 are processed to generate spectrograms 1410. A spectrogram (i.e., an audio spectrogram) is generated for each channel of audio data. A spectrogram is a way to visualize the spectrum of frequencies of a sound over time. In some examples, the spectrograms 1410 are mel spectrograms measured on the mel scale, wherein the vertical (y) axis of the spectrogram represents the distance between frequencies as it is judged by the human ear, which may be useful for speech applications. In some examples, the spectrograms 1410 are represented as numeric data such as NumPy matrices.

By using a two-dimensional visual representation of the time-varying acoustic spectral properties of each audio sample, the machine learning process can leverage techniques from the field of computer vision, which includes a well-developed set of machine learning methodologies, to classify the spectrogram inputs based on their labels 1414. The process of generating the spectrograms 1410 is not shown in the flowcharts of FIG. 11 or FIG. 12; in various examples, it could be considered part of training operation 1104, or a further pre-processing operation (not shown) of method 1100 between operations 1102 and 1104, or a further operation (not shown) at the end of method 1200.

After the training dataset has been generated (e.g., as a set of spectrograms 1410 corresponding to the channels of a set of noisy multi-channel audio samples 1408 and grouped together by their respective noisy multi-channel audio samples in association with a semantic ground-truth label) at operation 1102 of method 1100, the machine learning model 1412 is trained at operation 1104. Operation 1104 can be performed by a machine learning module of the machine 400 performing method 1100, or by other suitable modules or systems configured to perform machine learning. In the examples shown in FIG. 14, supervised learning is used to train the machine learning model 1412, using the labels 1414 as ground truth data associated with the training data samples of the training dataset (e.g., spectrograms 1410).

In the illustrated example, the machine learning model 1412 is a classifier using computer vision techniques to classify the spectrograms 1410 based on the associated labels 1414. The machine learning model 1412 includes a convolutional neural network (CNN) 1420 that extracts features from the spectrograms 1410 using an input layer and one or more convolution blocks. The output of the feature extraction CNN 1420 is provided to a classifier head 1418, which uses one or more fully connected layers and an output layer to output wearer speech detection data (e.g., logits, a probability distribution across classes, or a predicted class) for each input sample (e.g., each set of spectrograms 1410 corresponding to a noisy multi-channel audio samples 1408). For each input sample, the wearer speech detection data is compared to the corresponding label 1414 using an objective function (such as a loss function) to compute a loss 1416. The loss 1416 is back-propagated through the layers of the machine learning model 1412 to adjust the learnable parameters (e.g., weights) of each layer, or is otherwise used to adjust the learnable parameters of the machine learning models 1412. One or more training epochs may be performed to train the machine learning model 1412 using the training dataset as part of operation 1104, until a training termination condition is reached, such as convergence of the weights of the model. When training is complete, the machine learning model 1412, including its adjusted learnable parameter values, is considered to be a trained machine learning model 1002, ready for deployment (e.g., as part of the interaction system 100).

In various examples, the machine learning model 1412 can be configured to process input data having various characteristics. As described above, the durations of the audio samples used (and the lengths of their corresponding spectrograms 1410) may be of a fixed and uniform duration in some examples, such as 0.01, 0.1, 0.2, 0.5, or 1 second. The machine learning model 1412 may be configured to receive and process inputs having various numbers of audio channels (or a corresponding number of spectrograms 1410), such as 6 channels or 4 channels. In some examples, as described above, the machine learning model 1412 may be configured to process input samples having only four channels; for example, data from the first microphone 604 and fourth microphone 612 may be unused in some examples, either because these microphones are not present on the head-wearable apparatus 116, or because those microphones are present but are not used for bystander speech rejection. Such a configuration leverages the spatial alignment of the remaining microphones along the left diagonal spatial vector 618 and right diagonal spatial vector 616 without relying on the additional two microphones. As described below, experimental testing suggests that models trained on four channels of audio data may be more robust against hardware faults in some cases than models trained using six channels of audio data, as the failure of a single microphone can significantly decrease the predictive accuracy of the six-channel model.

The structure of the machine learning model 1412 can be varied in different examples. In the illustrated example, the feature extraction CNN 1420 includes three convolution blocks and the classifier head 1418 includes three fully connected blocks, in addition to any input and output layers—this may be referred to as a (3+3) block model, indicating three convolution blocks and three fully connected blocks. The illustrated feature extraction CNN 1420 has a first convolution block 1422 that includes a convolution layer, a max pooling layer, and a dropout layer; a second convolution block 1424 that includes another convolution layer, another max pooling layer, and another dropout layer;

and a third convolution block 1426 that includes a third convolution layer and a flattening layer. The illustrated classifier head 1418 has a first fully connected block 1428 having a linear layer and a dropout layer, a second fully connected block 1430 including a linear layer, and a third fully connected block 1432 having a linear layer. Tables 1a and 1b below show an example of the structure of a six-channel, 6-block (3+3) model as illustrated in FIG. 14. The information in the table indicates example values for the input activation map size, output activation map size, kernel size, padding used in convolution, activation function, and dropout value for the output activation map for each layer. In addition, Table 1b indicates example values used for the model according to various different input sample durations (or spectrogram lengths), i.e., 1.0 second, 0.5 seconds, 0.2 seconds, 0.1 seconds, and 0.01 seconds. In Tables 1a-1b and the subsequent tables below, "Conv" indicates a convolution layer, "RELU" indicates a rectified linear activation function (ReLU) function, and "SoftMax" indicates a SoftMax function.

TABLE 1a

Layers of the CNN of an example 6-channel, 6-block (3 + 3) model

| Layer | In | Out | Kernel Size | Padding | Activation | Dropout |
|---|---|---|---|---|---|---|
| Conv | 6 | 32 | 3 | Same | RELU | |
| Max Pool | | | 2 | | | |
| Dropout | | | | | | 0.2 |
| Conv | 32 | 64 | 3 | Same | RELU | |
| Max Pool | | | 2 | | | |
| Dropout | | | | | | 0.2 |
| Conv | 64 | 64 | 3 | Same | RELU | |
| Flatten | | | | | | |

TABLE 1b

Layers of the classifier head of an example 6-channel, 6-block (3 + 3) model

| Layer | Input Time | In | Out | Activation | Dropout |
|---|---|---|---|---|---|
| Linear | 1 Sec | 8192 | 64 | RELU | |
| | 0.5 Sec | 4096 | 64 | RELU | |
| | 0.2 Sec | 1024 | 64 | RELU | |
| | 0.1 Sec | 1024 | 64 | RELU | |
| | 0.01 Sec | 1024 | 64 | RELU | |
| Dropout | | | | | 0.2 |
| Linear | | 64 | 32 | RELU | |
| Linear | | 32 | 2 | SoftMax | |

Other models structures and configurations can be used in various examples, such as the example structures and configurations shown in the tables below:

TABLE 2a

Layers of the CNN of an example 6-channel, 4-block (2 + 2) model

| Layer | In | Out | Kernel Size | Padding | Activation | Dropout |
|---|---|---|---|---|---|---|
| Conv | 6 | 32 | 3 | Same | RELU | |
| Max Pool | | | 2 | | | |
| Dropout | | | | | | 0.2 |
| Conv | 32 | 64 | 3 | Same | RELU | |
| Flatten | | | | | | |

TABLE 2b

Layers of the classifier head of an example 6-channel, 4-block (2 + 2) model

| Layer | Input Time | In | Out | Activation | Dropout |
|---|---|---|---|---|---|
| Linear | 1 Sec | 32768 | 64 | RELU | |
| | 0.5 Sec | 16384 | 64 | RELU | |
| | 0.2 Sec | 6144 | 64 | RELU | |
| | 0.1 Sec | 4096 | 64 | RELU | |
| | 0.01 Sec | 4096 | 64 | RELU | |
| Dropout | | | | | 0.2 |
| Linear | | 62 | 2 | SoftMax | |

TABLE 3a

Layers of the CNN of an example 6-channel, 2-block (1 + 1) model

| Layer | In | Out | Kernel Size | Padding | Activation | Dropout |
|---|---|---|---|---|---|---|
| Conv | 6 | 64 | 3 | Same | RELU | |
| Max Pool | | | 2 | | | |
| Dropout | | | | | | 0.2 |
| Flatten | | | | | | |

TABLE 3b

Layers of the classifier head of an example 6-channel, 2-block (1 + 1) model

| Layer | Input Time | In | Out | Activation | Dropout |
|---|---|---|---|---|---|
| Linear | 1 Sec | 32768 | 2 | SoftMax | |
| | 0.5 Sec | 16384 | 2 | SoftMax | |
| | 0.2 Sec | 6144 | 2 | SoftMax | |
| | 0.1 Sec | 4096 | 2 | SoftMax | |
| | 0.01 Sec | 4096 | 2 | SoftMax | |

TABLE 4a

Layers of the CNN of an example 6-channel, 1-block (1 + 0) model

| Layer | Input Time | In | Out | Activation | Dropout |
|---|---|---|---|---|---|
| Flatten | | | | | |
| Linear | 1 Sec | 12288 | 2 | SoftMax | |
| | 0.5 Sec | 6144 | 2 | SoftMax | |
| | 0.2 Sec | 2688 | 2 | SoftMax | |
| | 0.1 Sec | 1536 | 2 | SoftMax | |
| | 0.01 Sec | 1536 | 2 | SoftMax | |

TABLE 5a

Layers of the CNN of an example 4-channel, 6-block (3 + 3) model

| Layer | In | Out | Kernel Size | Padding | Activation | Dropout |
|---|---|---|---|---|---|---|
| Conv | 4 | 32 | 3 | Same | RELU | |
| Max Pool | | | 2 | | | |
| Dropout | | | | | | 0.2 |
| Conv | 32 | 64 | 3 | Same | RELU | |
| Max Pool | | | 2 | | | |
| Dropout | | | | | | 0.2 |
| Conv | 64 | 64 | 3 | Same | RELU | |
| Flatten | | | | | | |

TABLE 5b

Layers of the classifier head of an example 4-channel, 6-block (3 + 3) model

| Layer | Input Time | In | Out | Activation | Dropout |
|---|---|---|---|---|---|
| Linear | 1 Sec | 8192 | 64 | RELU | |
| | 0.5 Sec | 4096 | 64 | RELU | |
| | 0.2 Sec | 1024 | 64 | RELU | |
| | 0.1 Sec | 1024 | 64 | RELU | |
| | 0.01 Sec | 1024 | 64 | RELU | |
| Dropout | | | | | 0.2 |
| Linear | | 64 | 32 | RELU | |
| Linear | | 32 | 2 | SoftMax | |

TABLE 6a

Layers of the CNN of an example 4-channel, 4-block (2 + 2) model

| Layer | In | Out | Kernel Size | Padding | Activation | Dropout |
|---|---|---|---|---|---|---|
| Conv | 4 | 32 | 3 | Same | RELU | |
| Max Pool | | | 2 | | | |
| Dropout | | | | | | 0.2 |
| Conv | 32 | 64 | 3 | Same | RELU | |
| Flatten | | | | | | |

TABLE 6b

Layers of the classifier head of an example 4-channel, 4-block (2 + 2) model

| Layer | Input Time | In | Out | Activation | Dropout |
|---|---|---|---|---|---|
| Linear | 1 Sec | 32768 | 64 | RELU | |
| | 0.5 Sec | 16384 | 64 | RELU | |
| | 0.2 Sec | 6144 | 64 | RELU | |
| | 0.1 Sec | 4096 | 64 | RELU | |
| | 0.01 Sec | 4096 | 64 | RELU | |
| Dropout | | | | | 0.2 |
| Linear | | 64 | 2 | SoftMax | |

TABLE 7a

Layers of the CNN of an example 4-channel, 2-block (1 + 1) model

| Layer | In | Out | Kernel Size | Padding | Activation | Dropout |
|---|---|---|---|---|---|---|
| Conv | 4 | 64 | 3 | Same | RELU | |
| Max Pool | | | 2 | | | |
| Dropout | | | | | | 0.2 |
| Flatten | | | | | | |

TABLE 7b

Layers of the classifier head of an example 4-channel, 2-block (1 + 1) model

| Layer | Input Time | In | Out | Activation | Dropout |
|---|---|---|---|---|---|
| Linear | 1 Sec | 32768 | 2 | SoftMax | |
| | 0.5 Sec | 16384 | 2 | SoftMax | |
| | 0.2 Sec | 6144 | 2 | SoftMax | |
| | 0.1 Sec | 4096 | 2 | SoftMax | |
| | 0.01 Sec | 4096 | 2 | SoftMax | |

TABLE 8a

Layers of the CNN of an example 4-channel, 1-block (1 + 0) model

| Layer | Input Time | In | Out | Activation | Dropout |
|---|---|---|---|---|---|
| Flatten | | | | | |
| Linear | 1 Sec | 8192 | 2 | SoftMax | |
| | 0.5 Sec | 4096 | 2 | SoftMax | |
| | 0.2 Sec | 1792 | 2 | SoftMax | |
| | 0.1 Sec | 1024 | 2 | SoftMax | |
| | 0.01 Sec | 1024 | 2 | SoftMax | |

CONCLUSION

Experimental testing suggests that at least some of the examples described herein can provide highly accurate, robust rejection of bystander speech without substantially reducing the acceptance of wearer speech for voice commands. Tests were conducted using each of the machine learning model configurations described above (6-channel and 4-channel versions of 6-, 4-, 2-, and 1-block models), at each of five input sample durations (0.01, 0.1, 0.2, 0.5, and 1.0 seconds), with a library of source audio samples 1438 consisting of 2,620 distinct audio samples, 80% of which were used for training and 20% for testing/validation.

Testing results suggest a number of design variants. First, the trained models reject non-speech sounds (i.e., noise) with a high degree of accuracy. This suggests that the use of VAD may be unnecessary. Second, the trained models are all more than 94% accurate in their classifications (with many performing above 99% accuracy), including both the 6-channel models, 4-channel models omitting audio data from the first microphone 604 and the fourth microphone 612, and 4-channel models omitting audio data from the second microphone 706 and fifth microphone 708, with very little loss of accuracy between the tested 6-channel and 4-channel models. This suggests that a head-wearable apparatus 116 fitted with only four microphones—two on the stems and two on the undersides of the frames—or with an additional backup pair of microphones on the stems (for a total of six)—could be deployed to accurately reject bystander speech in support of a voice command user input system.

As described above, some of the examples disclosed herein attempt to address one or more of the technical problems presented by bystander speech. In some examples, security and privacy can be maintained without loss of usability for a wearable device using a voice command interface, because the wearer of the device can issue voice commands without relying on further authentication such as a password, without the risk of bystanders being able to control or access the device using their own speech. In some examples, power and computational resources can be conserved by limiting the processing of speech data by a voice command system to those sounds in the environment that correspond to wearer speech. In some examples, the detection of wearer speech is robust and accurate enough, based on experimental testing of example implementations (as described above), that further safeguards or filters such as voiceprint identification or voice activity detection (VAD) are unnecessary for the purpose of limiting voice command functionality to the wearer of the device; thus, examples disclosed herein may also reduce the need for user-specific calibration or other cumbersome or technically complex techniques.

Glossary

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A system comprising:

a head-wearable apparatus, comprising a plurality of microphones, each microphone of the plurality of microphones being spatially separated from each other microphone of the plurality of microphones, thereby defining a set of spatial separations;

one or more processors; and a non-transitory computer readable storage medium comprising instructions that when executed by the one or more processors cause the one or more processors to perform operations comprising:

generating, by each individual microphone of the plurality of microphones, an audio signal corresponding to sound detected by the individual microphone, thereby generating a plurality of audio signals; and processing the plurality of audio signals, using a trained machine learning model, to generate wearer speech detection data representative of a likelihood that a wearer of the head-wearable apparatus is speaking;

wherein the trained machine learning model is trained using supervised learning based on a training dataset comprising a plurality of labelled multi-channel audio samples generated by:

generating a plurality of directional sounds, each directional sound originating from a different direction relative to a plurality of spatially separated microphones, the plurality of directional sounds including:

one or more wearer sounds originating from a direction corresponding to a wearer speech location; and a plurality of bystander sounds originating from a direction corresponding to a location other than the wearer speech location; and for each individual directional sound of the plurality of directional sounds:

for each individual recording microphone of the plurality of spatially separated recording microphones:

generating an audio recording, by the individual recording microphone, of the individual directional sound, thereby generating a plurality of audio recordings;

processing the plurality of audio recordings to generate a plurality of DIR filters corresponding to the plurality of directional sounds;

applying the plurality of DIR filters to a plurality of source audio samples to generate a plurality of multi-channel audio samples, each multi-channel audio sample comprising an audio channel for each microphone of the plurality of spatially separated microphones; and associating each of a plurality of the multi-channel audio samples with a respective label representative of whether a wearer sound corresponds to an individual DIR filter of the plurality of DIR filters, thereby generating the plurality of labelled multi-channel audio samples.

2. The system of claim 1, wherein two microphones of the plurality of microphones are located relative to the head-wearable apparatus such that a spatial vector passing through both of the two microphones passes through a wearer speech location where sound originates when the wearer is speaking.

3. The system of claim 2, wherein:

the head-wearable apparatus comprises a pair of augmented reality glasses having:

a pair of frames; and a pair of stems extending backward from the pair of frames when worn; and the two microphones of the plurality of microphones are located on one of the pair of stems and a lower portion of one of the pair of frames, respectively.

4. The system of claim 3, wherein:

the plurality of microphones comprises:

a first microphone in a first location on a left stem of the pair of stems;

a second microphone in a second location on the left stem, behind the first location;

a third microphone in a third location on a lower portion of a left frame of the pair of frames;

a fourth microphone in a fourth location on a right stem of the pair of stems;

a fifth microphone in a fifth location on the right stem, behind the fourth location; and a sixth microphone in a sixth location on a lower portion of a right frame of the pair of frames.

5. The system of claim 1, wherein the plurality of spatially separated recording microphones are spatially separated from each other by a same set of spatial separations as the plurality of microphones of the head-wearable apparatus.

6. The system of claim 1, wherein generating the plurality of labelled multi-channel audio samples further comprises:

combining one or more noise profiles with the plurality of labelled multi-channel audio samples, at one or more signal to noise ratios, to generate noisy multi-channel audio samples, each noisy multi-channel audio sample being an audio samples at one of the one or more signal to noise ratios and having one of the one or more noise profiles.

7. The system of claim 1, wherein generating the plurality of labelled multi-channel audio samples further comprises:

excluding from the training dataset one or more multi-channel audio samples generated using a DIR filter corresponding to a bystander sound.

8. The system of claim 1, wherein the trained machine learning model is a classifier comprising a convolutional neural network (CNN).

9. The system of claim 8, wherein the trained machine learning model is further trained by:

generating a plurality of spectrograms based on the plurality of labelled multi-channel audio samples;

using the plurality of spectrograms as training inputs; and using labels of the plurality of labelled multi-channel audio samples as training labels.

10. A method comprising:

training a machine learning model to generate a trained machine learning model using supervised learning based on a training dataset comprising a plurality of labelled multi-channel audio samples generated by:

generating a plurality of directional sounds, each individual directional sound originating from a different direction relative to a plurality of spatially separated recording microphones, the plurality of directional sounds including:

one or more wearer sounds originating from a direction corresponding to a wearer speech location; and a plurality of bystander sounds originating from a direction corresponding to a location other than the wearer speech location; and for each individual directional sound of the plurality of directional sounds:

for each individual recording microphone of the plurality of spatially separated recording microphones:

generating an audio recording, by the individual recording microphone, of the individual directional sound, thereby generating a plurality of audio recordings;

processing the plurality of audio recordings to generate a plurality of DIR filters corresponding to the plurality of directional sounds;

applying the plurality of DIR filters to a plurality of source audio samples to generate a plurality of multi-channel audio samples, each multi-channel audio sample comprising an audio channel for each microphone of the plurality of spatially separated recording microphones; and associating each of the plurality of the multi-channel audio samples with a respective label representative of whether a wearer sound corresponds to an individual DIR filter of the plurality of DIR filters, thereby generating the plurality of labelled multi-channel audio samples;

generating, by each individual microphone of a plurality of microphones of a head-wearable apparatus, an audio signal corresponding to sound detected by the individual microphone, thereby generating a plurality of audio signals;

the individual microphone of the plurality of microphones being spatially separated from each other microphone of the plurality of microphones, thereby defining a set of spatial separations; and processing the plurality of audio signals, using the trained machine learning model, to generate wearer speech detection data representative of a likelihood that a wearer of the head-wearable apparatus is speaking.

11. The method of claim 10, wherein two microphones of the plurality of microphones are located relative to the head-wearable apparatus such that a spatial vector passing through both of the two microphones passes through a wearer speech location where sound originates when the wearer is speaking.

12. The method of claim 11, wherein:

the head-wearable apparatus comprises a pair of augmented reality glasses having:

a pair of frames; and a pair of stems extending backward from the pair of frames when worn; and the two microphones of the plurality of microphones are located on one of the pair of stems and a lower portion of one of the pair of frames, respectively.

13. The method of claim 10, wherein the plurality of spatially separated recording microphones are spatially separated from each other by a same set of spatial separations as the plurality of microphones of the head-wearable apparatus.

14. The method of claim 10, wherein generating the plurality of labelled multi-channel audio samples further comprises:

combining one or more noise profiles with the plurality of labelled multi-channel audio samples, at one or more signal to noise ratios, to generate noisy multi-channel audio samples, each noisy multi-channel audio sample being an audio samples at one of the one or more signal to noise ratios and having one of the one or more noise profiles.

15. The method of claim 10, wherein generating the plurality of labelled multi-channel audio samples further comprises:

excluding from the training dataset one or more multi-channel audio samples generated using a DIR filter corresponding to a bystander sound.

16. The method of claim 10, wherein the trained machine learning model is a classifier comprising a convolutional neural network (CNN).

17. The method of claim 16, wherein the trained machine learning model is further trained by:

generating a plurality of spectrograms based on the plurality of labelled multi-channel audio samples;

using the plurality of spectrograms as training inputs; and using labels of the plurality of labelled multi-channel audio samples as training labels.

18. A non-transitory computer-readable storage medium, the computer-readable storage medium including instructions that when executed by a system, cause the system to:

train a machine learning model to generate a trained machine learning model using supervised learning based on a training dataset comprising a plurality of labelled multi-channel audio samples generated by:

generating a plurality of directional sounds, each individual directional sound originating from a different direction relative to a plurality of spatially separated recording microphones, the plurality of directional sounds including:

one or more wearer sounds originating from a direction corresponding to a wearer speech location; and a plurality of bystander sounds originating from a direction corresponding to a location other than the wearer speech location; and for each individual directional sound of the plurality of directional sounds:

for each individual recording microphone of the plurality of spatially separated recording microphones:

generating an audio recording, by the individual recording microphone, of the individual directional sound, thereby generating a plurality of audio recordings;

processing the plurality of audio recordings to generate a plurality of DIR filters corresponding to the plurality of directional sounds;

applying the plurality of DIR filters to a plurality of source audio samples to generate a plurality of multi-channel audio samples, each multi-channel audio sample comprising an audio channel for each microphone of the plurality of spatially separated recording microphones; and associating each of a plurality of the multi-channel audio samples with a respective label representative of whether a wearer sound corresponds to an individual DIR filter of the plurality of DIR filters, thereby generating the plurality of labelled multi-channel audio samples;

generate, by each individual microphone of a plurality of microphones of a head-wearable apparatus, an audio signal corresponding to sound detected by the individual microphone, thereby generating a plurality of audio signals;

the individual microphone of the plurality of microphones being spatially separated from each other microphone of the plurality of microphones, thereby define a set of spatial separations; and process the plurality of audio signals, using a trained machine learning model, to generate wearer speech detection data representative of a likelihood that a wearer of the head-wearable apparatus is speaking.

19. The non-transitory computer-readable storage medium of claim 18, wherein two microphones of the plurality of microphones are located relative to the head-wearable apparatus such that a spatial vector passing through both of the two microphones passes through the wearer speech location where sound originates when the wearer is speaking.

20. The non-transitory computer-readable storage medium of claim 19, wherein:

the head-wearable apparatus comprises a pair of augmented reality glasses having:

a pair of frames; and a pair of stems extending backward from the pair of frames when worn; and the two microphones of the plurality of microphones are located on one of the pair of stems and a lower portion of one of the pair of frames, respectively.

* * * * *